(12) United States Patent
Fujisawa

(10) Patent No.: US 8,312,232 B2
(45) Date of Patent: *Nov. 13, 2012

(54) CACHE MEMORY CONTROL CIRCUIT AND PROCESSOR FOR SELECTING WAYS IN WHICH A CACHE MEMORY IN WHICH THE WAYS HAVE BEEN DIVIDED BY A PREDETERMINDED DIVISION NUMBER

(75) Inventor: Toshio Fujisawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 648 days.

This patent is subject to a terminal disclaimer.

(21) Appl. No.: 12/483,445

(22) Filed: Jun. 12, 2009

(65) Prior Publication Data

US 2010/0017567 A1    Jan. 21, 2010

(30) Foreign Application Priority Data

Jul. 17, 2008    (JP) .................................. 2008-186304

(51) Int. Cl.
*G06F 12/00*    (2006.01)

(52) U.S. Cl. ......... 711/154; 711/118; 711/124; 711/128

(58) Field of Classification Search .................. 711/118, 711/124, 128, 154

See application file for complete search history.

(56) References Cited

U.S. PATENT DOCUMENTS 5,402,389 A * 3/1995 Flannagan et al. ....... 365/230.06
5,860,127 A * 1/1999 Shimazaki et al. ........... 713/600
8,065,486 B2 * 11/2011 Fujisawa ....................... 711/128
2002/0112126 A1 * 8/2002 Hayakawa et al. ........... 711/128
2006/0090034 A1 * 4/2006 Ishihara et al. ............... 711/118

FOREIGN PATENT DOCUMENTS

JP    2002-236616    8/2002

OTHER PUBLICATIONS

U.S. Appl. No. 12/399,463, filed Mar. 6, 2009, Toshio Fujisawa.

* cited by examiner

*Primary Examiner* — Arpan P. Savla
(74) *Attorney, Agent, or Firm* — Oblon, Spivak, McClelland, Maier & Neustadt, L.L.P.

(57) ABSTRACT

A cache memory control circuit includes a selecting section configured to select each way or two or more ways in a cache memory in which plural ways have been divided by a predetermined division number, in a predetermined order; a detecting section configured to detect a cache hit in each way; a controlling section configured to, if the cache hit is detected, stop the selection of each way in the selecting section; and a division number changing section having a comparing section, which compares respective values of two pieces of read data from the cache memory having been propagated through two paths, one of which has a predetermined amount of delay with respect to the other one, the division number changing section which changes the predetermined division number depending on whether the two pieces of the read data match or mismatch with each other in the comparing section.

14 Claims, 17 Drawing Sheets

FIG.4
| OPERATING FREQUENCY | DIVISION NUMBER | PRIORITY |
|---|---|---|
| 100 | 4 | 1 |
|  | 2 | 2 |
|  | 1 | 3 |
| 200 | 2 | 1 |
|  | 1 | 2 |
| 400 | 1 | 1 |
FIG.5A CLK (400MHz)
FIG.5B CPU FREQUENCY (100MHz)
FIG.5C CE
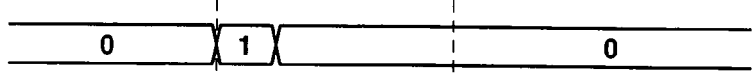
FIG.5D WAY ENABLE [3:0]
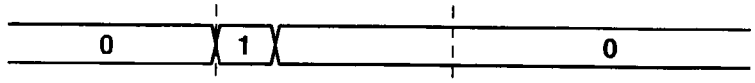
FIG.5E CACHE HIT [3:0]
FIG.5F DATA TO CPU

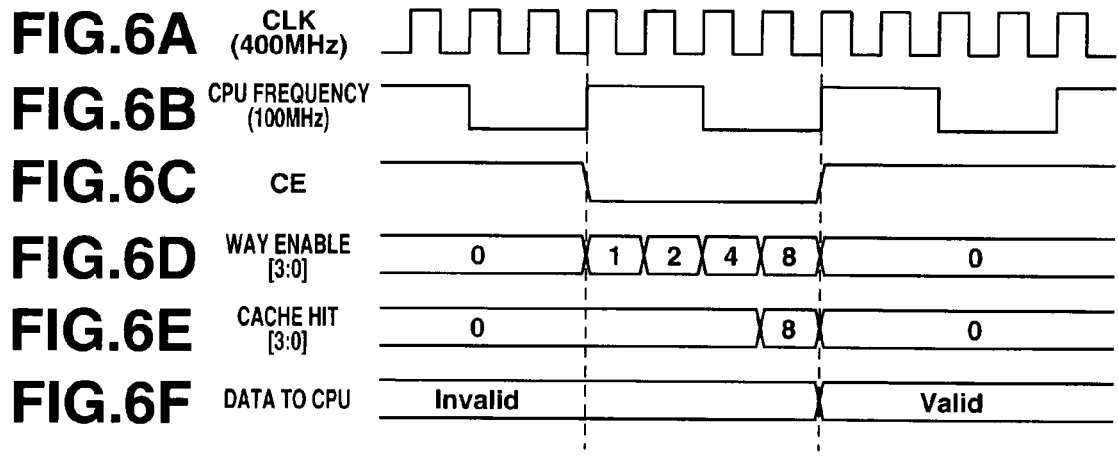
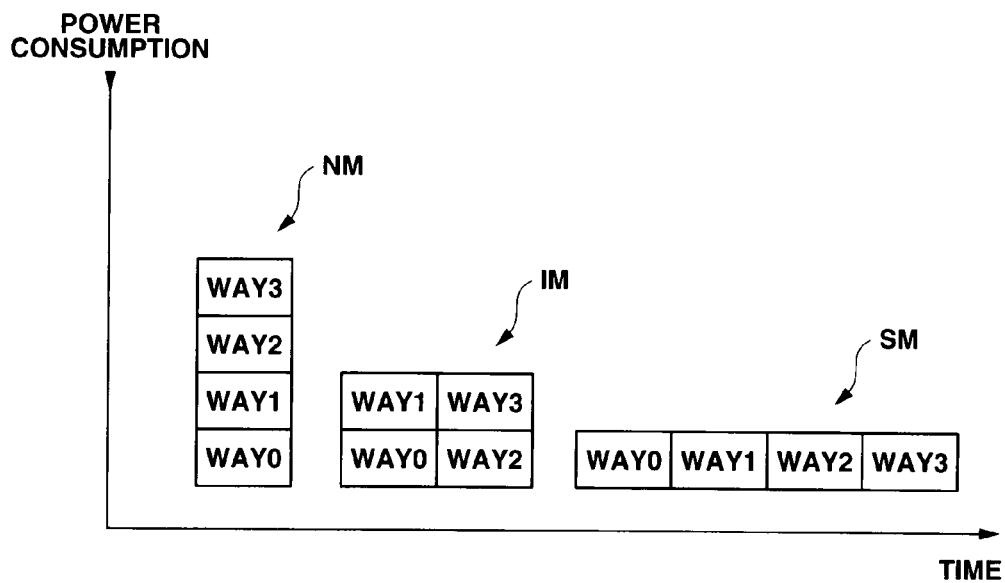
FIG.7

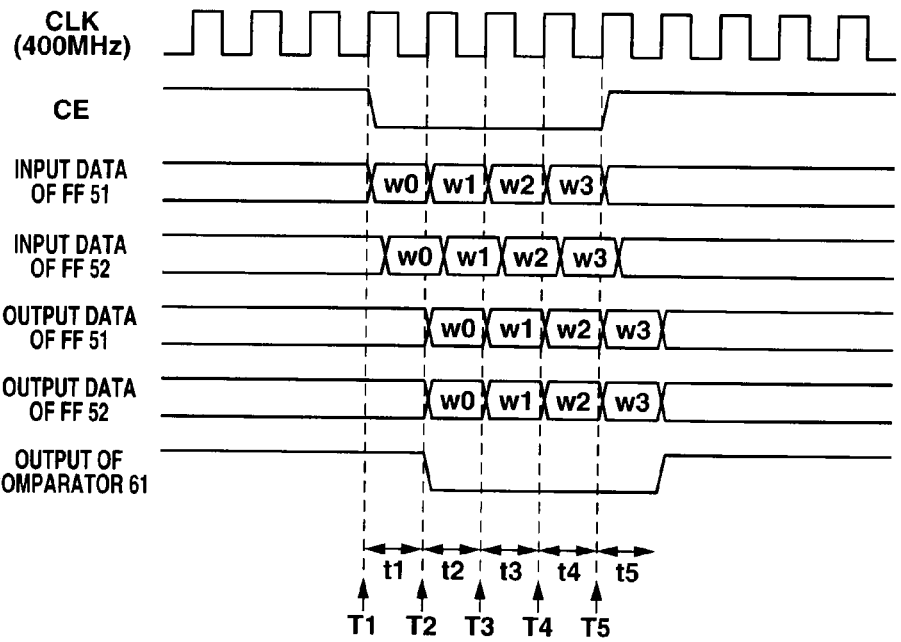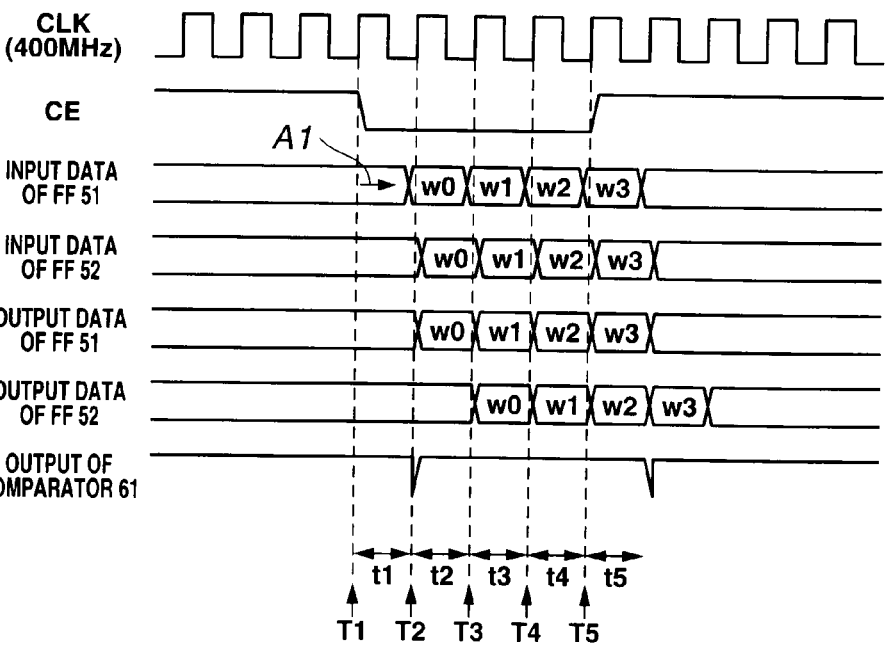

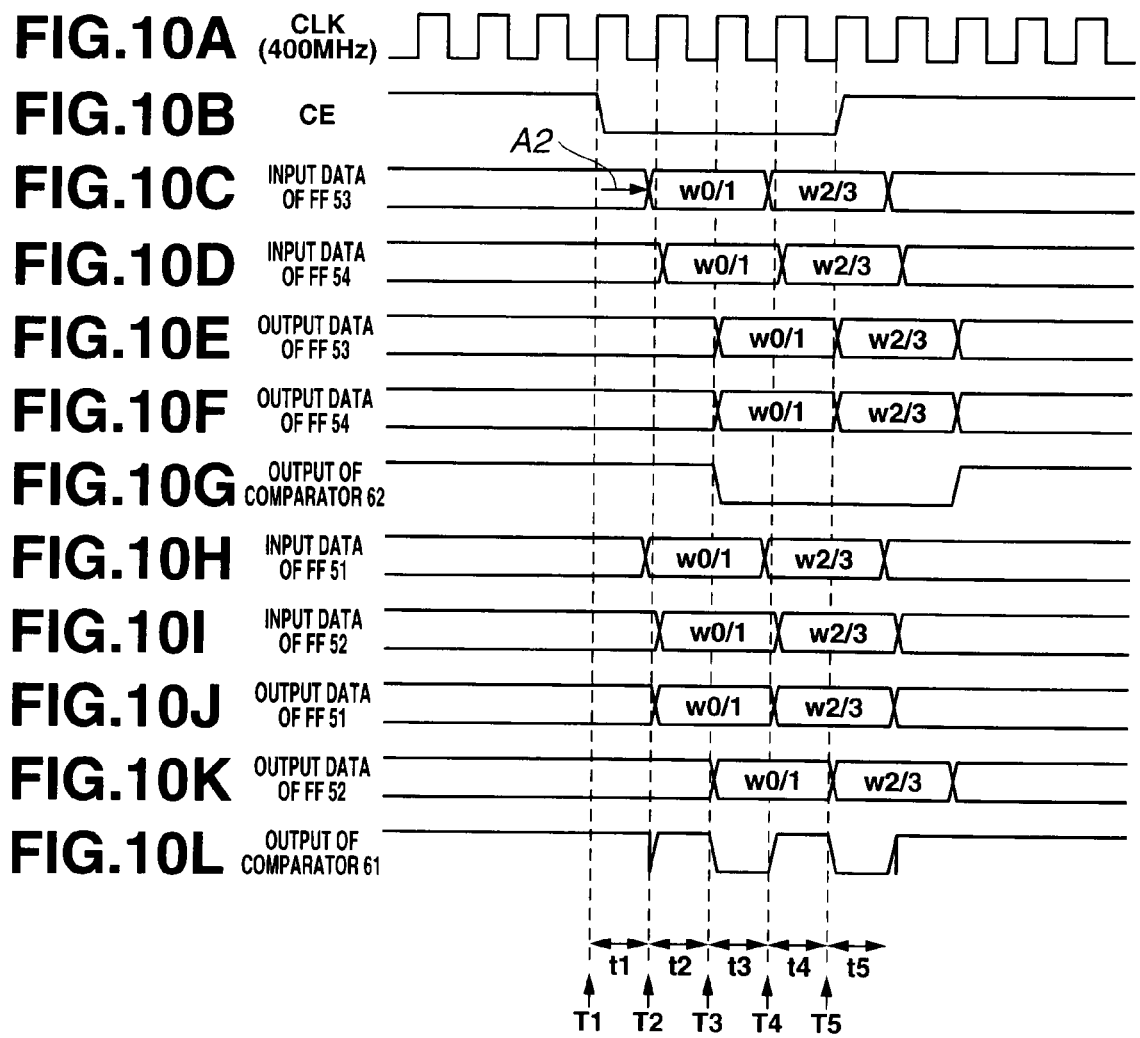

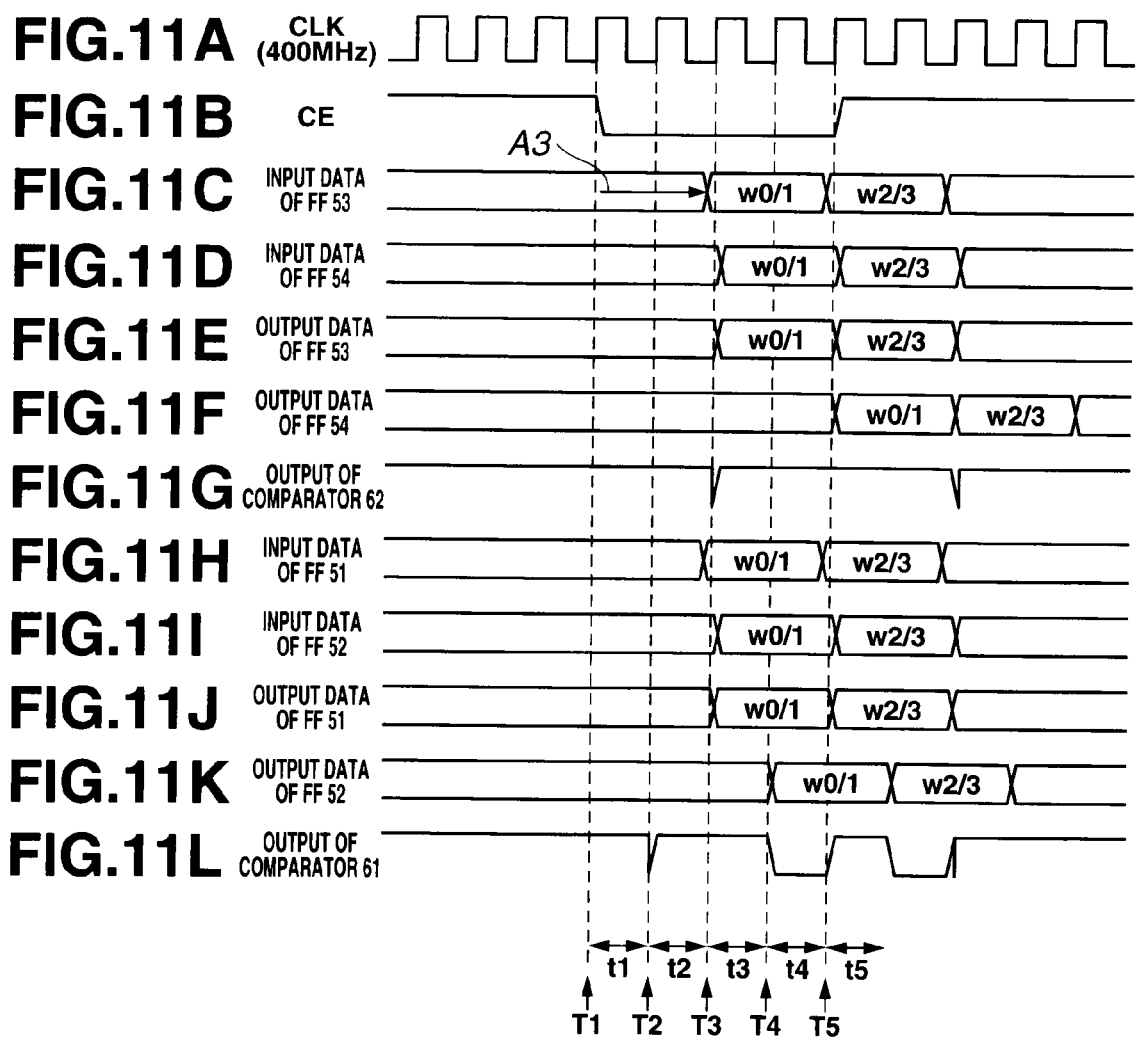

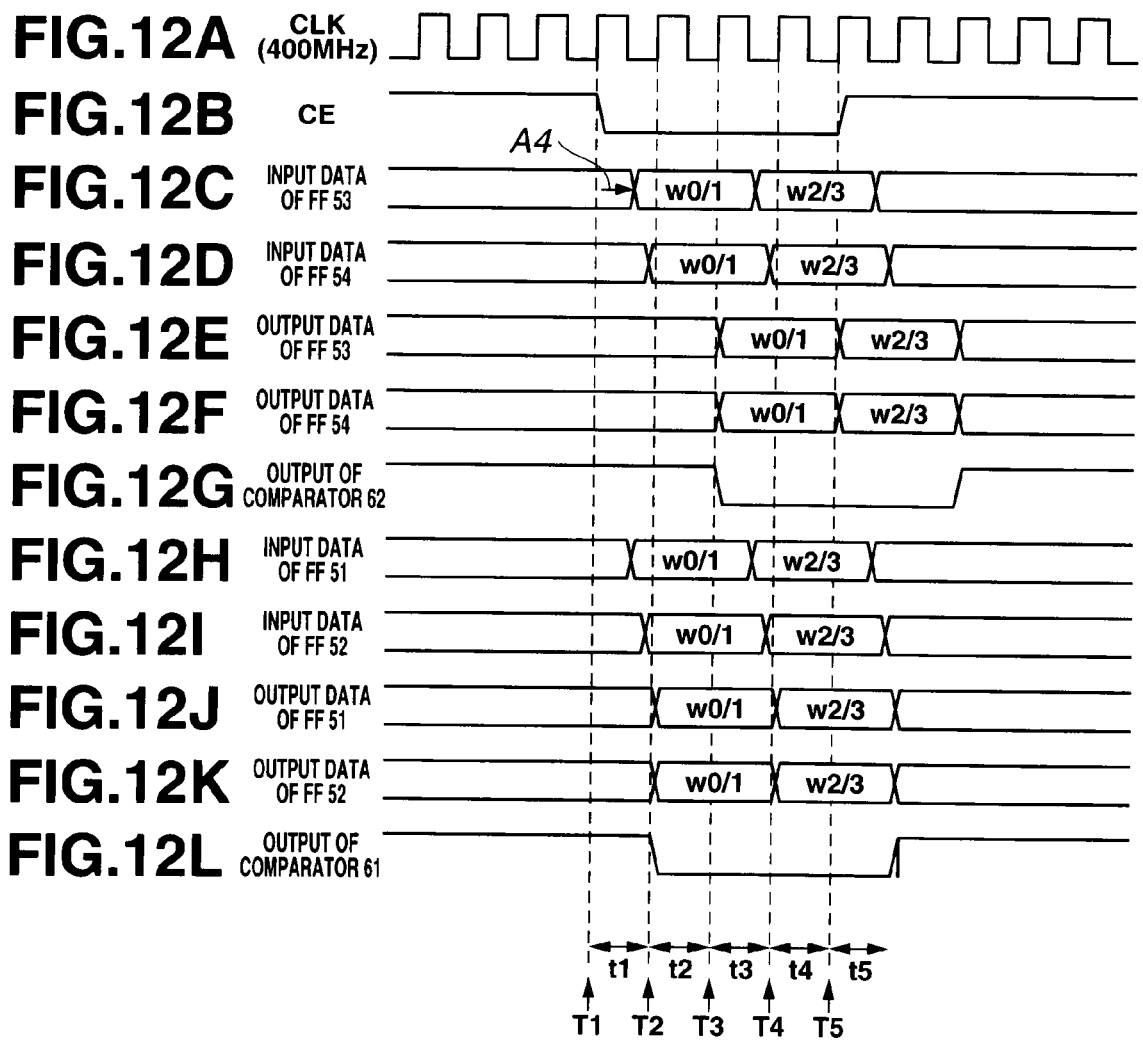

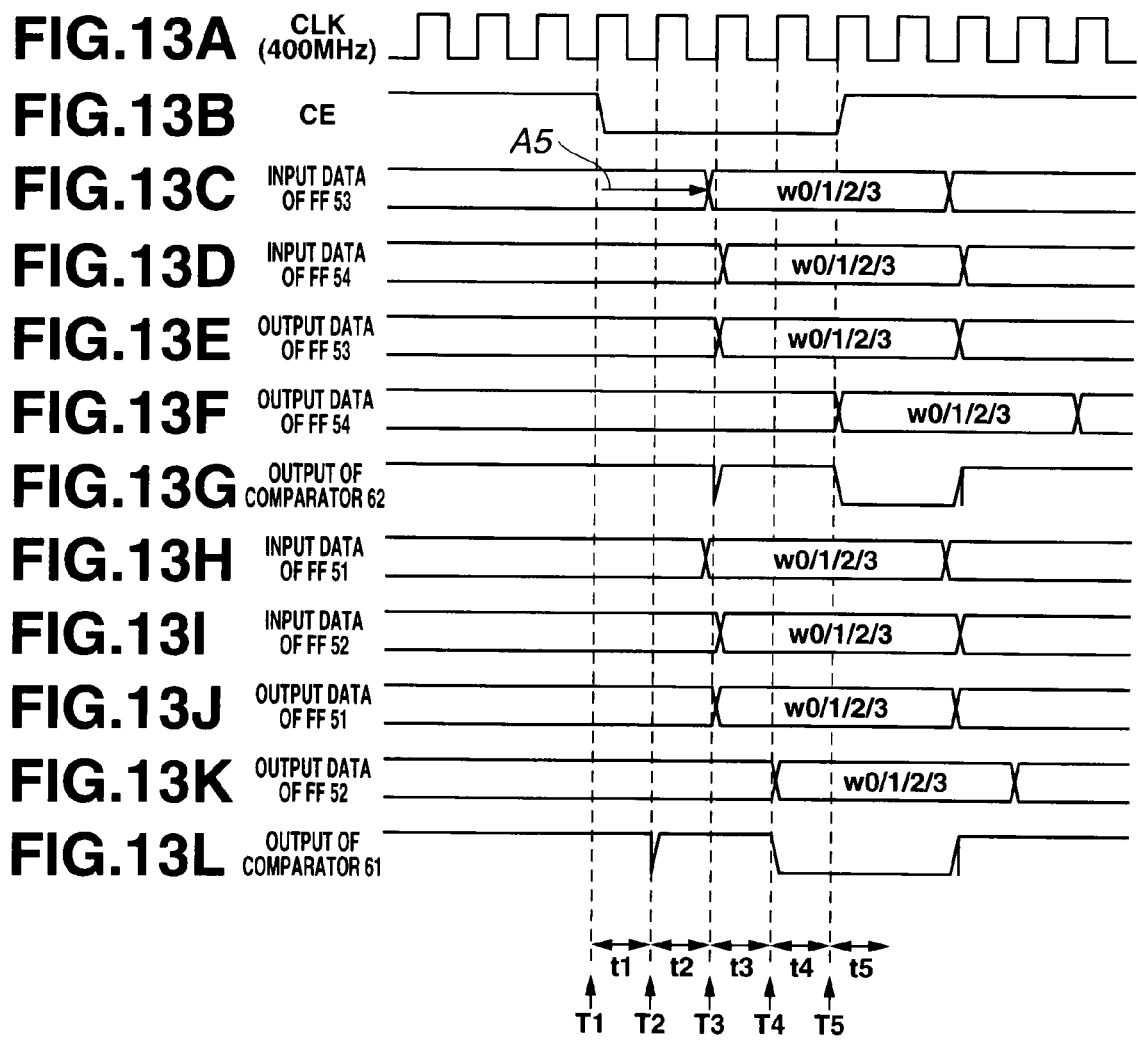

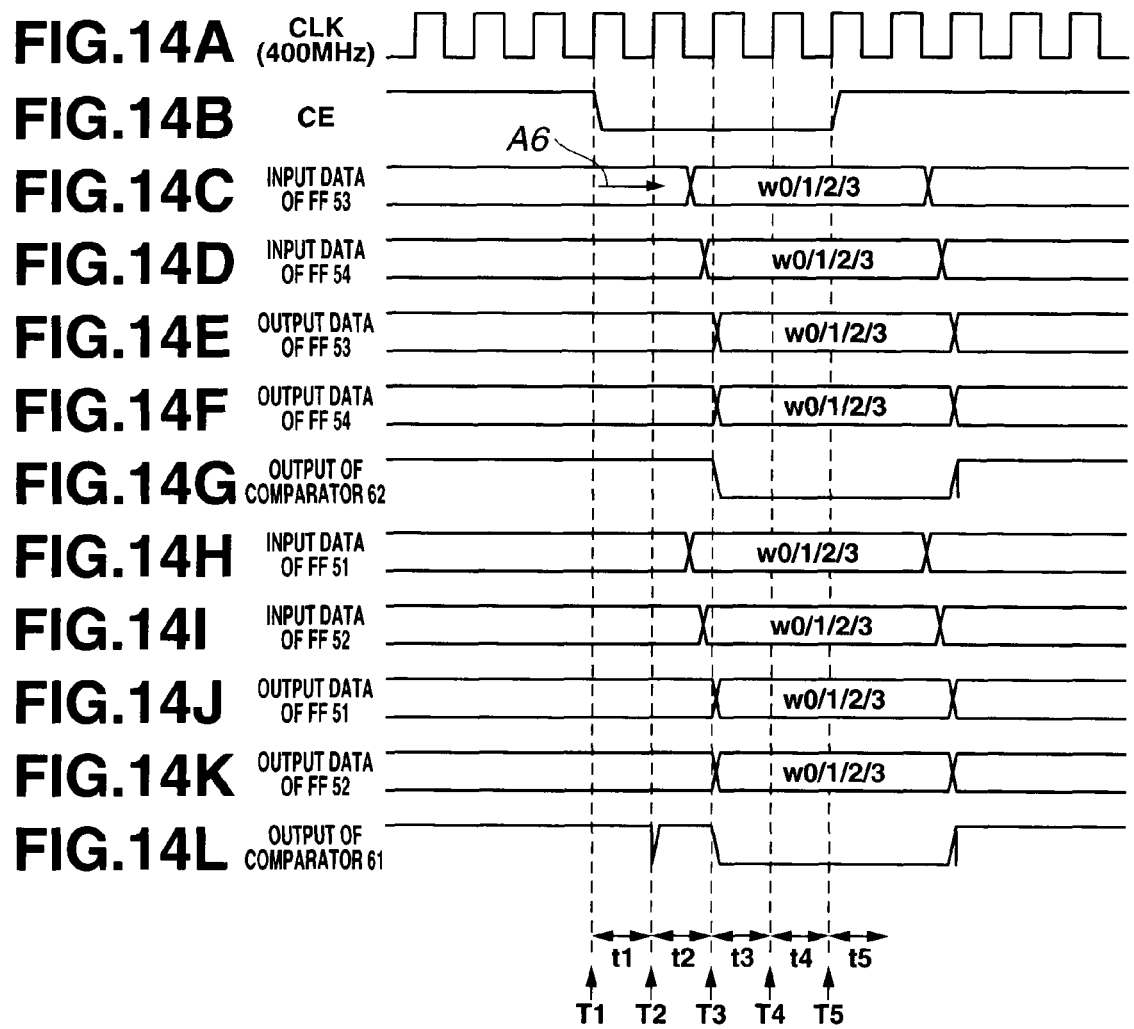

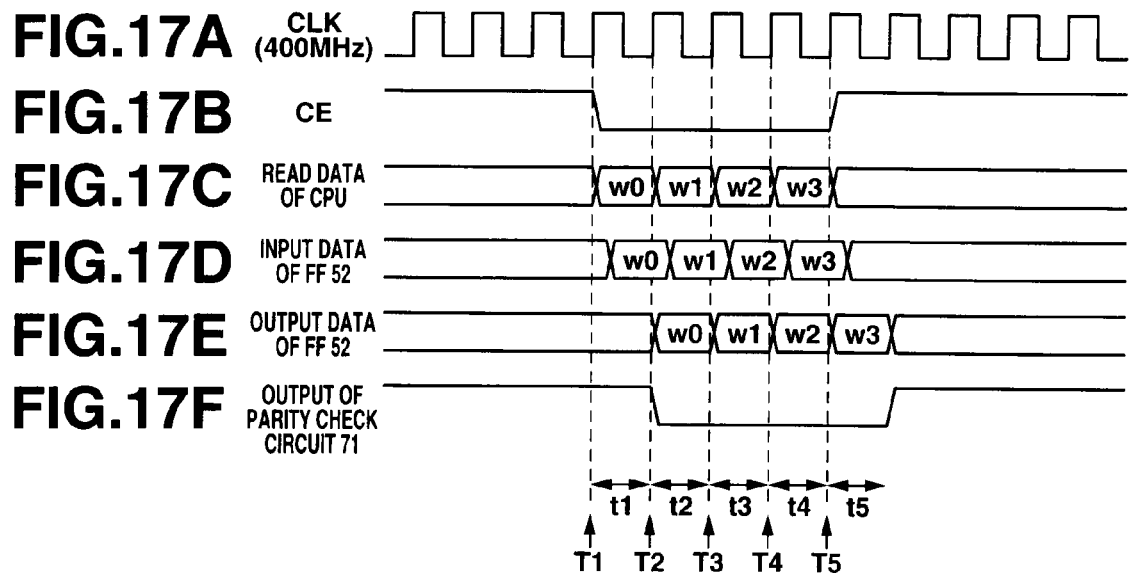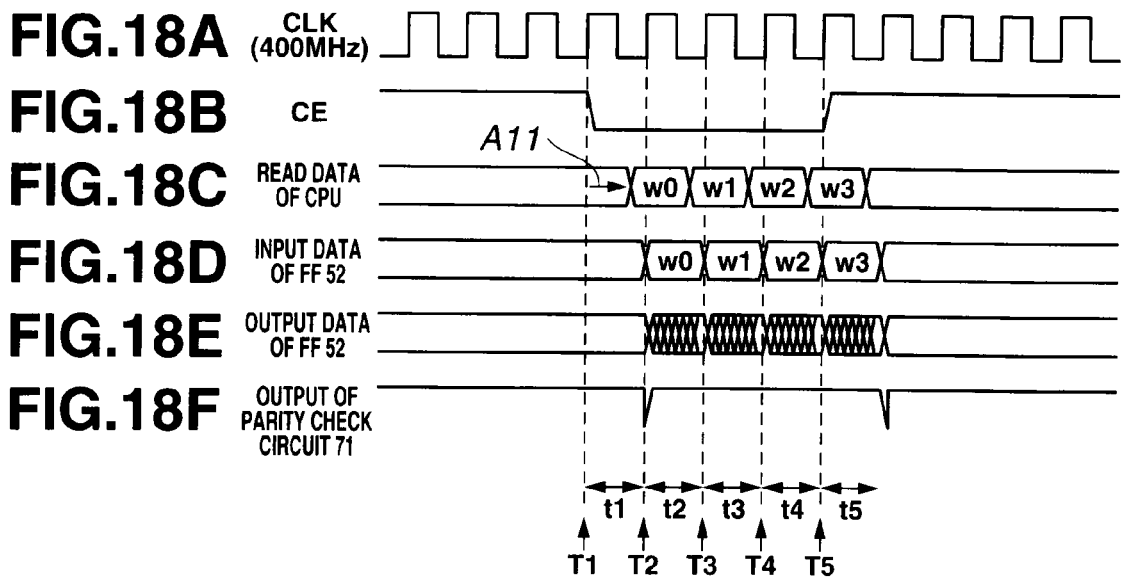

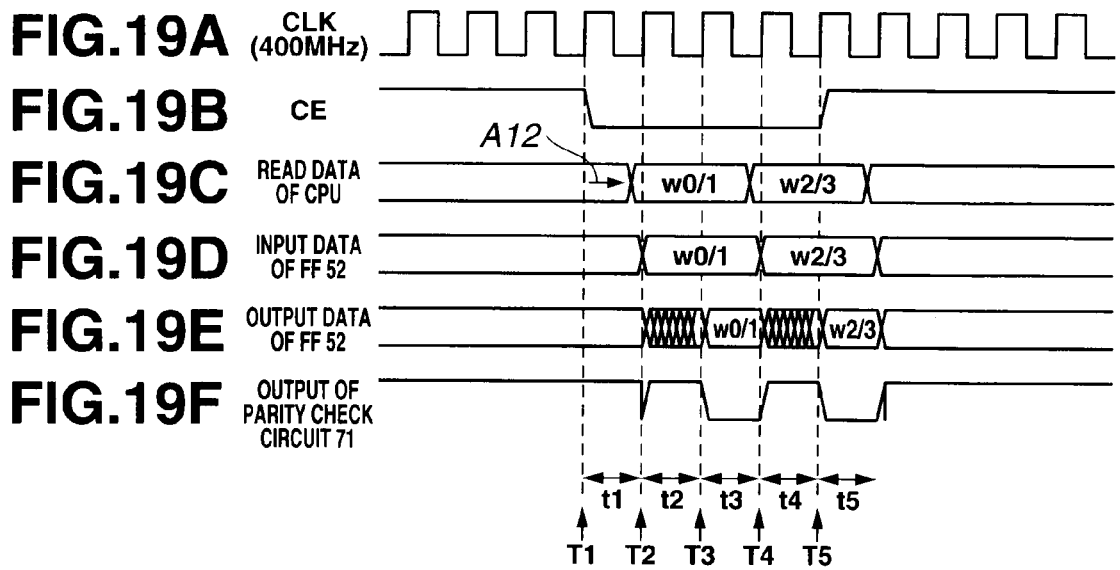
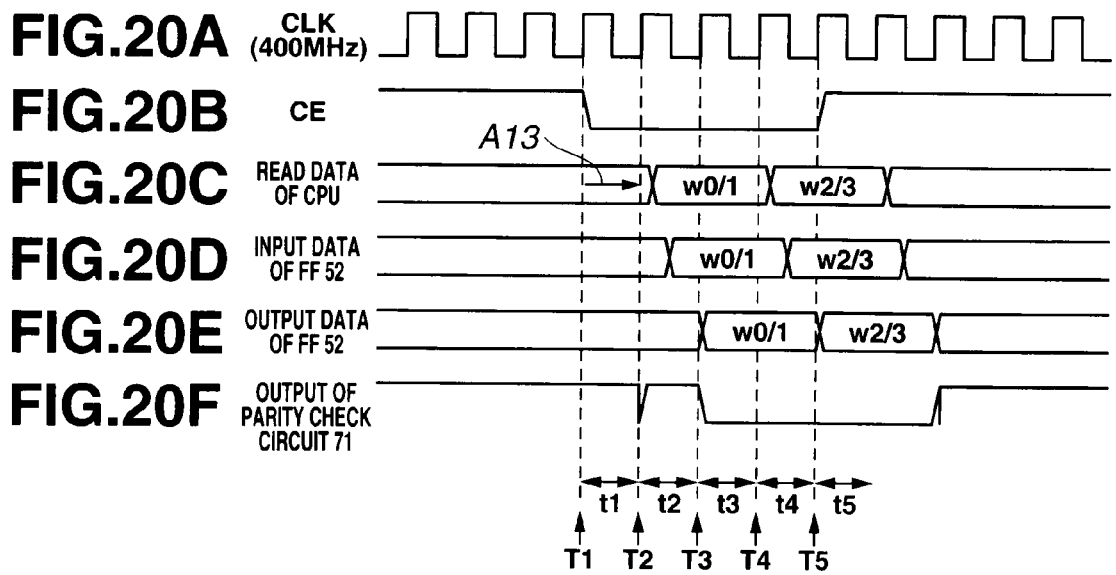

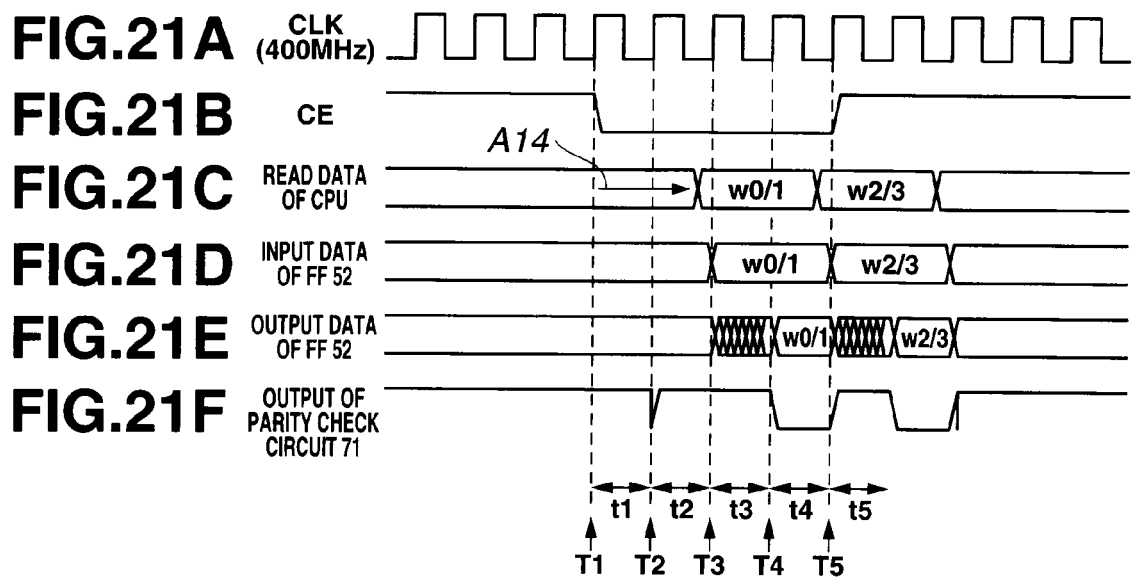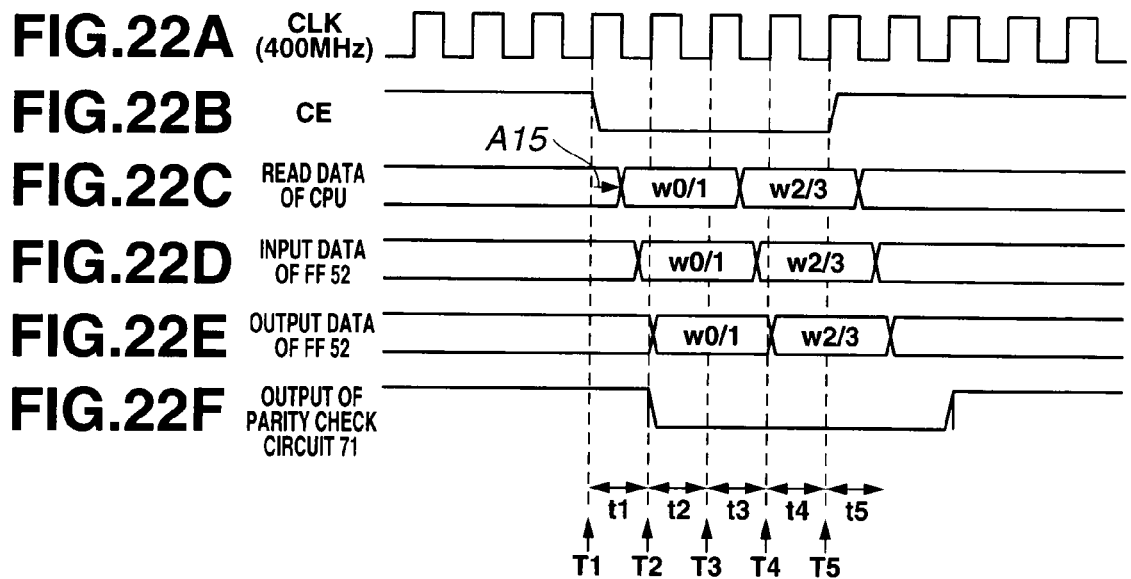

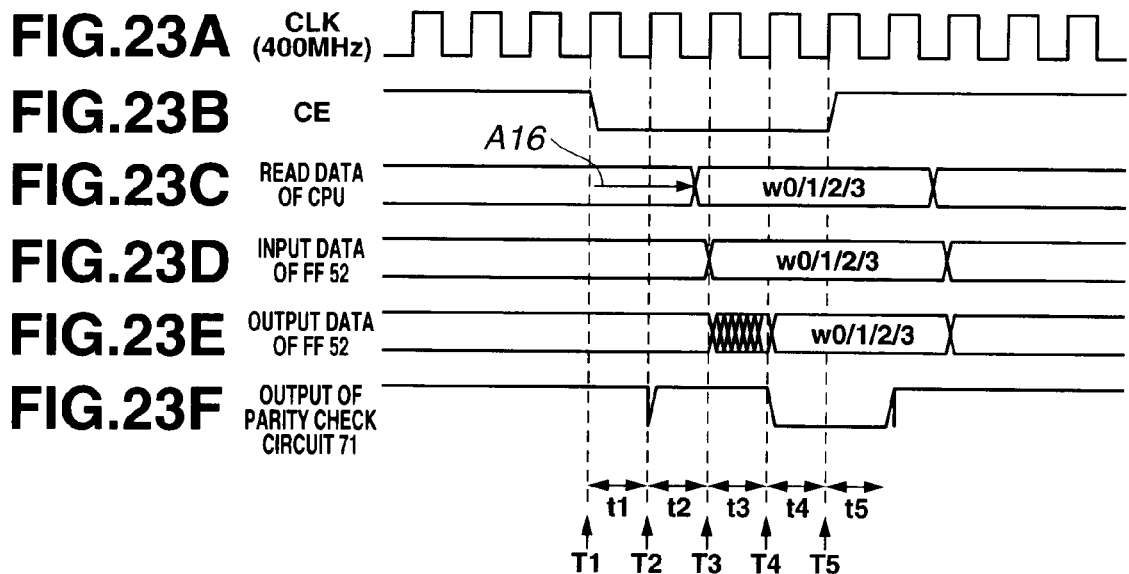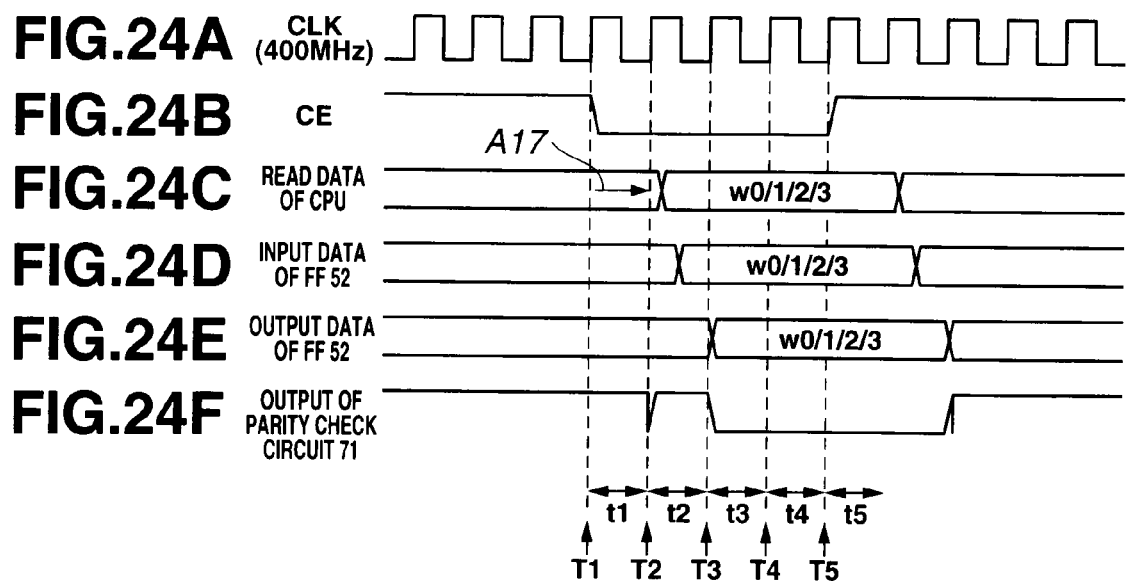

CACHE MEMORY CONTROL CIRCUIT AND PROCESSOR FOR SELECTING WAYS IN WHICH A CACHE MEMORY IN WHICH THE WAYS HAVE BEEN DIVIDED BY A PREDETERMINDED DIVISION NUMBER

CROSS REFERENCE TO RELATED APPLICATION

This application is based upon and claims the benefit of priority from the prior Japanese Patent Application No. 2008-186304 filed in Japan on Jul. 17, 2008, the entire contents of which are incorporated herein by reference.

BACKGROUND OF THE INVENTION

1. Field of the Invention

The present invention relates to a cache memory control circuit and a processor, and particularly relates to a cache memory control circuit and a processor for a cache memory having a plurality of ways.

2. Description of the Related Art

Conventionally, in a processor, a cache memory has been generally used for reading or writing data from or to a main memory at a high speed (with low latency). The cache memory is provided between a central processing unit (hereinafter, referred to as "CPU") and the main memory.

Some cache memories store a plurality of pieces of tag data of the same entry address, that is, have a plurality of ways. Based on an entry address in an address from the CPU, such a cache memory simultaneously reads tags from all the ways, and simultaneously compares the tags with a frame address. When any tag matching (hit) occurs, such a cache memory outputs a word indicated by a word address, in data read from the way which has hit, to the CPU.

In recent years, for example, as disclosed in Japanese Patent Application Laid-Open Publication No. 2002-236616, a cache memory having two access modes in order to save power in the processor has been proposed. According to the proposition, a tag comparison is performed for all the ways in a normal access mode, while a tag comparison is performed only for a selected way in a unique access mode. As a result, in the unique access mode, only a minimum necessary memory area operates, which results in a reduction in power consumption.

However, in the unique access mode in the above described proposition, a cache memory area to be used is limited. Therefore, even if the same software operates, a frequency of cache misses may increase in comparison with the normal access mode. In such a case, since a cache refill operation frequently occurs, power consumption is not sufficiently reduced.

Furthermore, if switching between the access modes is not appropriately performed, the power consumption may also not be sufficiently reduced.

BRIEF SUMMARY OF THE INVENTION

According to one aspect of the present invention, there can be provided a cache memory control circuit including a selecting section configured to be able to select each way or two or more ways in a cache memory in which a plurality of ways have been divided by a predetermined division number, in a predetermined order; a cache hit detecting section configured to detect a cache hit in the each way; a controlling section configured to, if the cache hit is detected, stop the selection of the each way or two or more ways in the selecting section; and a division number changing section having a comparing section, which compares respective values of two pieces of read data from the cache memory having been propagated through two read data paths, one of which has a predetermined amount of delay with respect to the other one, the division number changing section being configured to change the predetermined division number depending on whether the two pieces of the read data match or mismatch with each other in the comparing section.

BRIEF DESCRIPTION OF THE DRAWINGS

FIG. 4 is a diagram showing an example of a division number table according to the first embodiment of the present invention;

FIGS. 5A to 5F are timing charts for explaining operations of the processor according to the first embodiment of the present invention;

FIGS. 6A to 6F are timing charts in a case where a cache hit has occurred in a way #3, according to the first embodiment of the present invention;

FIG. 7 is a diagram for conceptually explaining a power consumption state in three access modes including a normal access mode, a sequential access mode and an intermediate mode, according to the first embodiment of the present invention;

FIGS. 8A to 8G are timing charts showing states of input data and output data of two FFs, and an output of a comparator, when the cache memory operates in a 400 MHz mode and an operation timing margin is large, according to the first embodiment of the present invention;

FIGS. 9A to 9G are timing charts showing the states of the input data and the output data of the two FFs, and the output of the comparator, when the cache memory operates in the 400 MHz mode and the operation timing margin is small, according to the first embodiment of the present invention;

FIGS. 10A to 10L are timing charts showing states of input data and output data of four FFs, and outputs of two comparators, when the cache memory operates in a 200 MHz mode, the operation timing margin in the 400 MHz mode is small, and the operation timing margin in the 200 MHz mode is large, according to the first embodiment of the present invention;

FIGS. 11A to 11L are timing charts showing the states of the input data and the output data of the four FFs, and the outputs of the two comparators, when the cache memory operates in the 200 MHz mode and the operation timing margin in the 200 MHz mode is small, according to the first embodiment of the present invention;

FIGS. 12A to 12L are timing charts showing the states of the input data and the output data of the four FFs, and the outputs of the two comparators, when the cache memory operates in the 200 MHz mode and both the operation timing margins in the 200 MHz mode and the 400 MHz mode are large, according to the first embodiment of the present invention;

FIGS. 13A to 13L are timing charts showing the states of the input data and the output data of the four FFs, and the outputs of the two comparators, when the cache memory operates in a 100 MHz mode and the operation timing margin in the 200 MHz mode is small, according to the first embodiment of the present invention;

FIGS. 14A to 14L are timing charts showing the states of the input data and the output data of the four FFs, and the outputs of the two comparators, when the cache memory operates in the 100 MHz mode and the operation timing margin in the 200 MHz mode is large, according to the first embodiment of the present invention;

FIGS. 17A to 17F are timing charts showing states of read data of a CPU core, input data and output data of an FF, and an output of a parity check circuit, when a cache access controller operates in the 400 MHz mode and the operation timing margin at 400 MHz is large, according to the third embodiment of the present invention;

FIGS. 18A to 18F are timing charts showing the states of the read data of the CPU core, the input data and the output data of the FF, and the output of the parity check circuit, when the operation timing margin at 400 MHz is small while the operation is performed in the 400 MHz mode, according to the third embodiment of the present invention;

FIGS. 19A to 19F are timing charts showing the states of the read data of the CPU core, the input data and the output data of the FF, and the output of the parity check circuit, when the operation timing margin at 400 MHz is small and the operation timing margin in the 200 MHz mode is large while the operation is performed in the 200 MHz mode, according to the third embodiment of the present invention;

FIGS. 20A to 20F are timing charts showing the states of the read data of the CPU core, the input data and the output data of the FF, and the output of the parity check circuit, when the operation is performed in the 200 MHz mode, there is no operation timing margin in the 400 MHz mode (that is, there is a timing violation), and the operation timing margin at 200 MHz is large, according to the third embodiment of the present invention;

FIGS. 21A to 21F are timing charts showing the states of the read data of the CPU core, the input data and the output data of the FF, and the output of the parity check circuit, when the operation timing margin at 200 MHz is small while the operation is performed in the 200 MHz mode, according to the third embodiment of the present invention;

FIGS. 22A to 22F are timing charts showing the states of the read data of the CPU core, input data and output data of an FF 52, and the output of the parity check circuit, when the operation timing margin at 400 MHz is large and the operation timing margin in the 200 MHz mode is large while the operation is performed in the 200 MHz mode, according to the third embodiment of the present invention;

FIGS. 23A to 23F are timing charts showing the states of the read data of the CPU core, the input data and the output data of the FF, and the output of the parity check circuit, when the operation timing margin at 200 MHz is small while the operation is performed in the 100 MHz mode, according to the third embodiment of the present invention;

FIGS. 24A to 24F are timing charts showing the states of the read data of the CPU core, the input data and the output data of the FF, and the output of the parity check circuit, when the operation timing margin in the 200 MHz mode is large while the operation is performed in the 100 MHz mode, according to the third embodiment of the present invention.

DETAILED DESCRIPTION OF THE EMBODIMENTS OF THE INVENTION

Hereinafter, embodiments of the present invention will be described with reference to the drawings.

First Embodiment

1. Configuration

Figure 1:
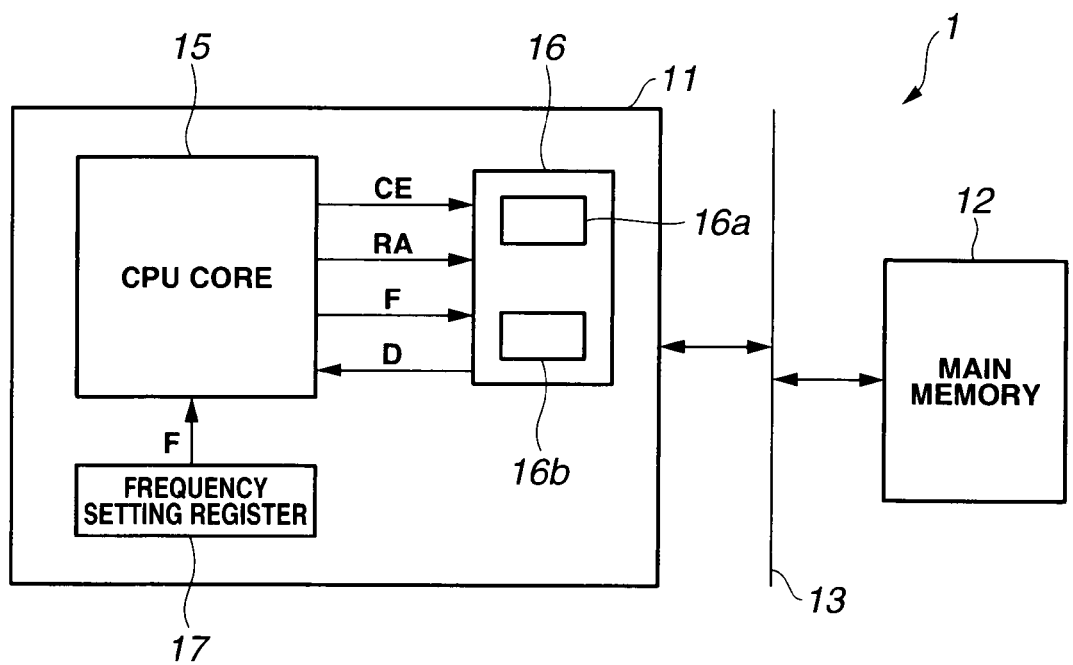
FIG. 1 is a configuration diagram showing a configuration of a processor according to a first embodiment of the present invention.

First, based on FIG. 1, a configuration of a processor including a cache memory according to the present embodiment will be described. FIG. 1 is a configuration diagram showing the configuration of the processor according to the present embodiment.

In FIG. 1, a processor 1 is configured to include a CPU 11, a main memory 12 and a system bus 13. The CPU 11 includes a CPU core 15, a cache memory 16 and a frequency setting register 17.

The CPU core 15 accesses instructions or data required for executing a program (hereinafter, also simply referred to as "data") from the cache memory 16, and executes the program. The CPU core 15 outputs a real address RA in the main memory 12 to the cache memory 16. If data corresponding to the address RA exists in the cache memory 16, the data D is transferred from the cache memory to the CPU core 15. If the data does not exist in the cache memory 16, the data is read from the main memory 12 and written into the cache memory 16 by a refill process, and then the data is transferred to the CPU core 15.

It should be noted that, here, although an example does not include a memory management unit (MMU) for simplicity of explanation, if the memory management unit (MMU) is included, the CPU core 15 outputs a virtual address instead of the real address.

As a signal for operating the cache memory 16, the CPU core 15 outputs a chip enable signal CE to the cache memory 16. Therefore, when using the cache memory 16, the CPU core 15 outputs the chip enable signal CE.

A value of an operating frequency of the CPU 11 is set in the frequency setting register 17 as an operating frequency setting section. The operating frequency of the CPU 11 is set, for example, from outside by a user. Operating frequency data F set in the frequency setting register 17 is inputted to the CPU core 15. The CPU core 15 outputs the operating frequency data F to the cache memory 16. (F may be outputted from the frequency setting register to both the CPU core and the cache memory.) In the configuration of the present embodiment, any of 100 MHz, 200 MHz and 400 MHz can be set in the CPU core 15.

Figure 25:
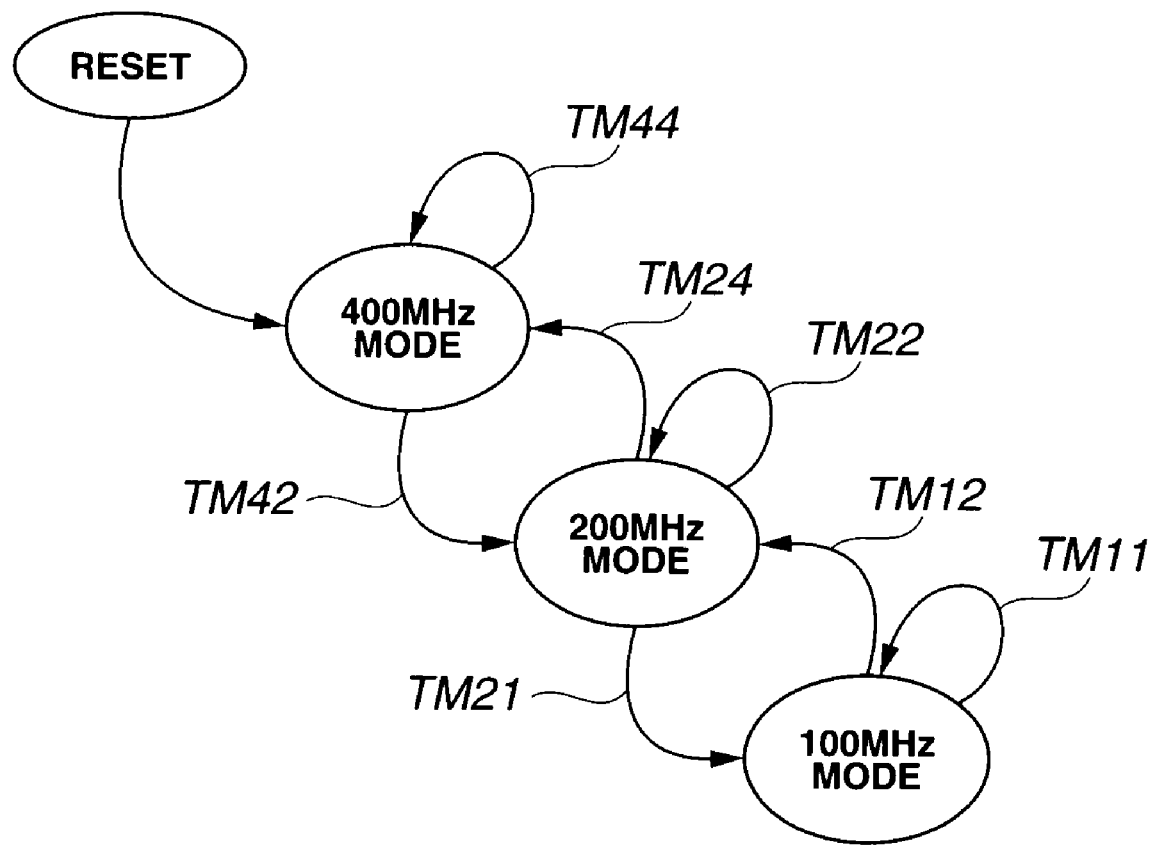
FIG. 25 is an operation mode transition diagram showing transition of the access mode of the cache memory according to the first to third embodiments of the present invention.

FIG. 25 is an operation mode transition diagram showing transition of an access mode of the cache memory 16. If the CPU 11 is reset, the access mode is set to a 400 MHz mode. Subsequently, as will be described later, if a timing violation at 400 MHz is detected, the access mode is changed to a 200 MHz mode, as indicated by an arrow TM42. If the timing violation at 200 MHz is detected in the 200 MHz mode, the access mode is changed to a 100 MHz mode, as indicated by an arrow TM21.

Moreover, if the timing violation at 200 MHz is not detected while the cache memory 16 is executing in the access mode at 100 MHz, the access mode is changed to the 200 MHz mode, as indicated by an arrow TM12. Furthermore, if the timing violation at 400 MHz is not detected in the 200 MHz mode, the access mode is changed to the 400 MHz mode, as indicated by an arrow TM24.

If the timing violation at 400 MHz is not detected during the execution in the 400 MHz mode, the access mode of the cache memory 16 remains in the 400 MHz mode, as indicated by an arrow TM44. If the timing violation at 400 MHz is detected during the execution in the 200 MHz mode, the access mode of the cache memory 16 remains in the 200 MHz mode, as indicated by an arrow TM22. If the timing violation at 200 MHz is detected during the execution in the 100 MHz mode, the access mode of the cache memory 16 remains in the 100 MHz mode, as indicated by an arrow TM11.

With respect to an operating frequency of the cache memory 16, the operation is performed at the operating frequency equal to or higher than the operating frequency F of the CPU core 15. Here, the operating frequency of the cache memory 16 is assumed to be 400 MHz.

The CPU core 15 outputs, for example, real address data RA of 32-bit width to the cache memory 16, and the cache memory 16 outputs 32-bit word data D to the CPU core 15.

In addition to a small capacity memory (not shown) configured to store the data, the cache memory 16 includes a cache access controller 16$a$ as a control circuit, and a division number changing section 16$b$. Configurations of the cache access controller 16$a$ and the division number changing section 16$b$ will be described later.

Figure 2:
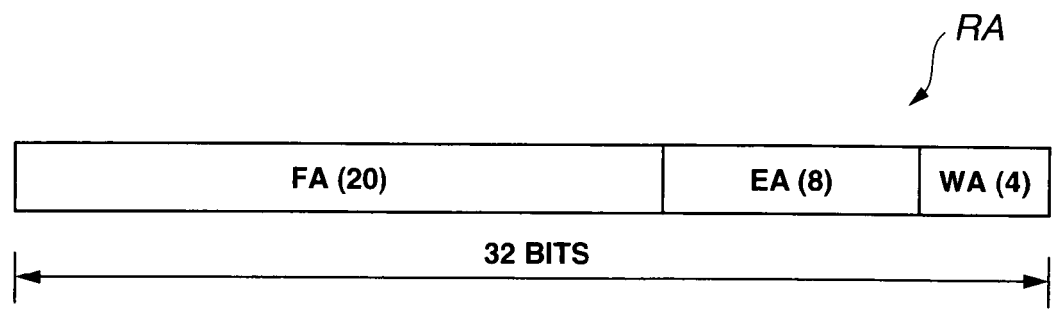
FIG. 2 is a diagram showing a configuration example of real address data according to the first embodiment of the present invention.

FIG. 2 is a diagram showing a configuration example of the real address data outputted from the CPU core 15. Here, the real address data RA is 32 bits, and consists of a 20-bit frame address FA in higher bits, an 8-bit entry address EA, and a 4-bit word address WA in lower bits.

Figure 3:
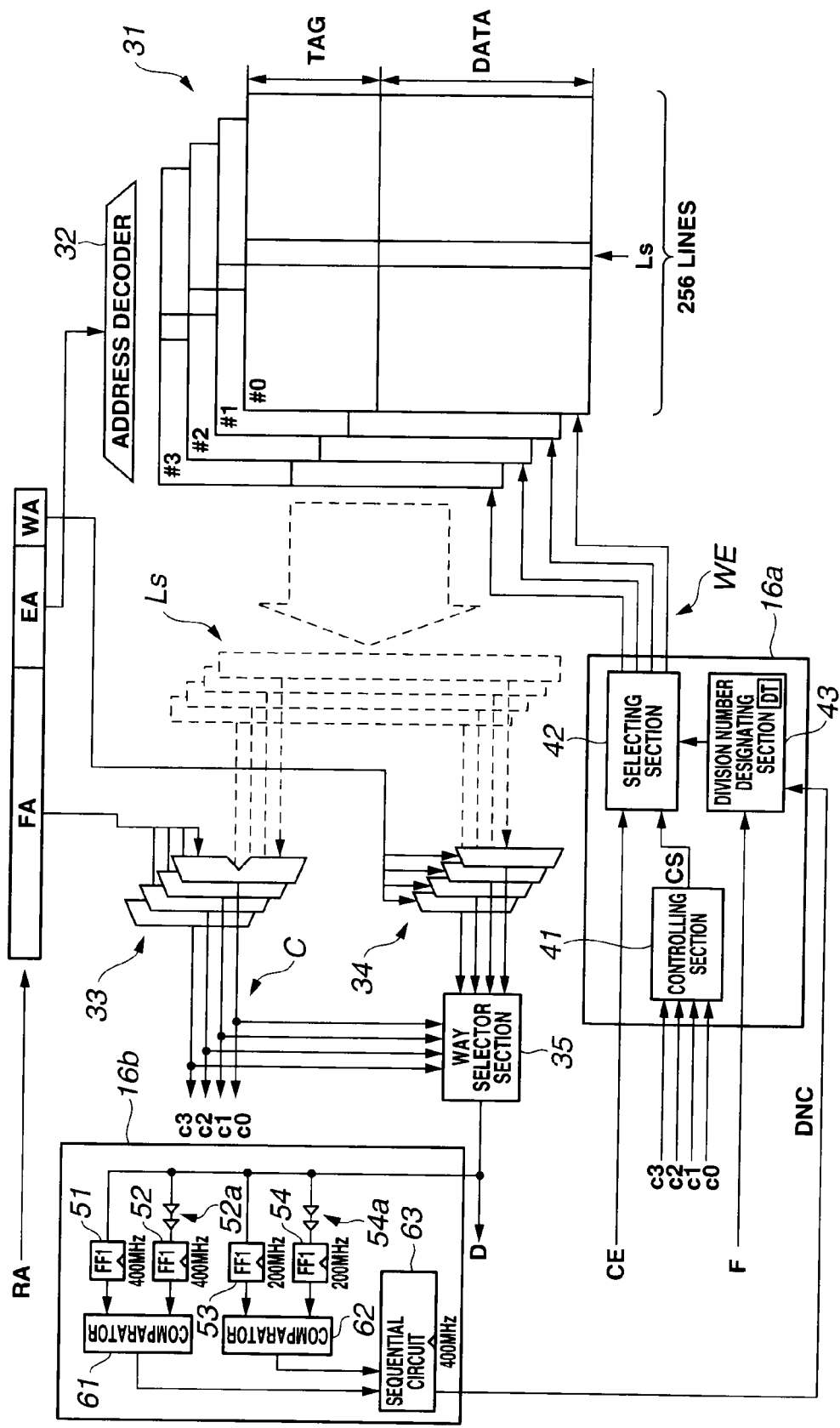
FIG. 3 is a diagram for explaining a configuration example of a cache memory according to the first embodiment of the present invention.

FIG. 3 is a diagram for explaining a configuration example of the cache memory 16.

The cache memory 16 has a small capacity storing section 31 configured to store the data. Furthermore, the cache memory 16 has the cache memory control circuit including an address decoder 32, a comparing section 33, a word selector section 34, a way selector section 35, the cache access controller 16$a$, and the division number changing section 16$b$. The cache access controller 16$a$ includes a controlling section 41, a selecting section 42, and a division number designating section 43. The small capacity storing section 31 is a memory consisting of N (N is an integer equal to or larger than two) ways, here, four ways. The cache memory 16 is a 4-way set associative cache memory. The comparing section 33 and the word selector section 34 have a plurality of comparators (here, four comparators) and a plurality of word selectors (here, four word selectors), respectively, in a manner corresponding to lines Ls (here, four lines) selected in the respective ways.

Here, each way has 256 blocks, that is, 256 lines, and each line is designated by the 8-bit entry address EA.

Each line has a data section including 16 pieces of the word data, and a tag section including frame address data. Which word data in the 16 pieces of the word data is read is designated by the 4-bit word address WA in the inputted real address RA.

The real address data RA, the chip enable signal CE, and the operating frequency data F are inputted to the cache memory 16. The cache memory 16 outputs read data D to the CPU core 15.

The controlling section 41 in the cache access controller 16$a$ is a circuit to which match signals c0 to c3 that are comparison result signals from the comparing section 33 to be described later are inputted. The match signals c0 to c3 are signals indicating a cache hit. The selecting section 42 is a circuit to which a control signal CS from the controlling section 41 and the chip enable signal CE are inputted. As will be described later, if any of the match signals c0 to c3 is inputted, the controlling section 41 outputs the control signal CS to the selecting section 42, and thereby stops outputting of a way enable signal WE.

The selecting section 42 outputs the way enable signal WE for each way. As will be described later, the selecting section 42 selects each way so that all the four ways are simultaneously enabled, or each way is enabled in a predetermined order to avoid temporal overlap, or furthermore, a plurality of (here, two) ways are enabled in a predetermined order to avoid the temporal overlap. The way enable signal WE for each way is a signal for enabling each way, that is, for operating each way.

The division number designating section 43 is a circuit to which the operating frequency data F, and a division number change signal DNC from the division number changing section 16$b$ are inputted. The division number designating section 43 outputs division number data corresponding to the inputted operating frequency data F, to the selecting section 42, and changes a division number depending on the division number change signal DNC.

Therefore, the plurality of ways in the cache memory 16 are divided by a designated division number, and each way or two or more ways which have been divided are selected in the predetermined order in the selecting section 42.

The operating frequency F of the CPU core 15 is variable, and as described above, the operation can be performed at any of 400 MHz, 200 MHz and 100 MHz. The operating frequency F can be set by the user as described above. The data of the designated operating frequency is inputted to the division number designating section 43.

The division number changing section 16$b$ is configured to include a plurality of, here four, flip-flops (hereinafter, abbreviated as "FFs") 51 to 54, a comparing section including a plurality of, here two, comparators 61 and 62, and a sequential circuit 63.

The read data D of the number of bits equal to bit width of data paths is inputted to the FFs 51 to 54 from the way selector section 35. Particularly, the read data D is inputted to the FFs 52 and 54 via a predetermined number of buffer circuits 52$a$ and 54$a$. In other words, the read data D for the CPU core 15 is branched immediately before input pins of the respective FFs 51 to 54 configured to latch the data, and is subsequently inputted to the respective FFs 51 to 54. Particularly, the inputting to the FFs 52 and 54 is performed via several stages of the buffer circuits. Hence, the read data D from the way selector section 35 is propagated through two data paths, one of which has a predetermined amount of delay with respect to the other one, and subsequently, comparison is performed in each of the comparators 61 and 62.

Moreover, clock signals of 400 MHz are inputted to the FFs 51 and 52, and clock signals of 200 MHz are inputted to the FFs 53 and 54.

A timing of the clock signal inputted to each FF is synchronized with an input timing of the real address RA from the CPU core 15 to a register of the cache memory 16, and an input timing of the read data D to the CPU core 15. More specifically, the timing of the clock signal inputted to each FF is synchronized with a write timing of the read data D from the CPU core 15 to the cache memory 16, and a read timing of the data from the cache memory 16 by the CPU core 15, for example, a timing of a rising edge of a pulse signal.

Clocks of 400 MHz and clocks of 200 MHz are inputted to the two comparators 61 and 62 in the comparing section, respectively. Each clock is a clock of a timing of a frequency depending on the division number. Hence, each of the two comparators 61 and 62 compares two pieces of the read data at a timing of a frequency depending on a predetermined division number.

Output data of the FFs 51 and 52 is inputted to the comparator 61, and output data of the FFs 53 and 54 is inputted to the comparator 62. If two pieces of input data match with each other, each of the comparators 61 and 62 outputs a signal "0" indicating the match, and in a case of mismatch, outputs a signal "1" indicating the mismatch. As will be described later, data retained by each of the FFs 51 to 54 configured to latch the data is constantly equal under a good operating condition, and the output of each of the comparators 61 and 62 is "0" (a value representing the match).

Output signals of the two comparators 61 and 62 are inputted to the sequential circuit 63 as a determining section configured to determine to change the division number. In addition, the clock signal of 400 MHz is inputted to the sequential circuit 63. The output signal of the sequential circuit 63 is the division number change signal DNC, and is outputted to the division number designating section 43.

Moreover, an access mode signal (not shown) indicating a state of a current access mode of the cache memory 16 is also inputted to the sequential circuit 63. How the sequential circuit 63 operates will be described later.

Here, a case where an operating speed of a transistor is gradually reduced due to an increase in a chip temperature, a decrease in a power supply voltage, or the like, will be considered. In such a case, for the CPU core 15, a timing at which the read data from the cache memory 16 arrives at an FF (not shown) configured to temporarily latch the read data in order for the CPU core 15 to read the read data, is gradually delayed. However, one or more buffer circuits are provided so that the timing violation occurs in the above described path from the way selector section 35 to the FF 52 or the FF 54, before the timing violation occurs in a path of the data. The paths including the buffer circuits 52a and 54a provided at pre-stages of the FFs 52 and 54 have a larger amount of delay corresponding to the number of the buffer circuits.

The paths including the FFs 51 and 52 are paths in which the timing violation at the time of 400 MHz is detected. The paths including the FFs 53 and 54 are paths in which the timing violation at the time of 200 MHz is detected. The FFs 51 and 52 and the comparator 61 constitute a 400 MHz timing violation detection circuit. The FFs 53 and 54 and the comparator 62 constitute a 200 MHz timing violation detection circuit.

If the timing violation occurs in the FF 52 or the FF 54, all or some of outputs of the FF 52 or the FF 54 become indefinite values. As a result, the output of the corresponding comparator becomes "1" (a value indicating the mismatch).

The access mode signal indicating the access mode of the cache memory 16, and the output signals of the respective comparators 61 and 62 are inputted to the sequential circuit 63. As will be described later, if the timing violation at 400 MHz or the timing violation at 200 MHz occurs, the sequential circuit 63 outputs the division number change signal DNC to the division number designating section 43 based on the signal indicating the respective violation from the respective comparator and the access mode signal.

Therefore, the division number changing section 16b is a circuit having the comparators 61 and 62, which compares two pieces of the read data having being propagated through two paths, one of which has the predetermined amount of delay with respect to the other one, the circuit being configured to output the division number change signal DNC for changing the division number, depending on whether the two pieces of the read data match or mismatch with each other in the comparators 61 and 62.

When the cache access controller 16a receives the division number change signal DNC from the division number changing section 16b, the access mode of the cache memory 16 is changed. In other words, the cache access controller 16a changes the division number for the plurality of ways based on the received division number change signal DNC. It should be noted that switching of the access mode is performed after completion of a read cycle in which the division number change signal DNC has been received, in a period in which the read cycle is not performed.

For example, when the CPU core 15 operates at 100 MHz, and the cache memory 16 operates in the 400 MHz mode, that is, in an access mode in which search is performed for each one way up to four times, if the timing violation at 400 MHz has been detected, after the completion of the read cycle at the time of the detection, the sequential circuit 63 outputs the division number change signal DNC for switching the access mode of the cache memory 16 to the 200 MHz mode, that is, to an access mode in which the search is performed for each two ways up to twice. As a result, the access mode of the cache memory 16 is changed to the 200 MHz mode, as indicated by the arrow TM42 of FIG. 25.

Similarly, when the cache memory 16 operates in the 200 MHz mode, if the timing violation at 200 MHz has been detected, after the completion of the read cycle at the time of the detection, the sequential circuit 63 outputs the division number change signal DNC for switching the access mode of the cache memory 16 to the 100 MHz mode, that is, to an access mode in which the search is collectively performed for four ways (that is, a conventional 4-way cache memory operation). As a result, the access mode of the cache memory 16 is changed to the 100 MHz mode, as indicated by the arrow TM21 of FIG. 25.

Hence, in the comparator, if the mismatch is detected, a division number change signal configured to decrease the division number is outputted.

Moreover, the switching from the 100 MHz mode to the 200 MHz mode in the cache memory 16 is performed in a next read cycle after the read cycle in which the timing violation at 200 MHz has no longer been detected. The switching from the 200 MHz mode to the 400 MHz mode is performed in a next read cycle after the read cycle in which the timing violation at 400 MHz has no longer been detected.

Hence, in the comparator, if the match is detected, a division number change signal configured to increase the division number is outputted.

It should be noted that, typically, a speed of a variation in the chip temperature or the power supply voltage is incomparably slower than a clock cycle time of a chip. Hence, for example, the output of the comparator operates to hold "1" for a while when the chip temperature is increased, and to return to "0" when the chip temperature is decreased after tens of minutes.

Incidentally, the entry address EA in the real address RA inputted to the cache memory 16 is supplied to the address decoder 32. The address decoder 32 selects a line corresponding to the entry address EA from each of four ways #0 to #3 in the small capacity storing section 31. Since the entry address EA is 8 bits, one line is necessarily selected in each way.

Moreover, the word address WA in the real address data RA is supplied to the word selector section 34. Each of the four word selectors in the word selector section 34 selects word data corresponding to the word address WA from each of the selected four lines Ls in the small capacity storing section 31. Since the word address WA is 4 bits, one piece of the word data is necessarily selected in each of the lines Ls. The word data selected in each word selector is outputted to the way selector section 35.

Furthermore, the frame address FA in the real address RA is supplied to one of inputs of each of the four comparators in the comparing section 33. Four pieces of the frame address data of four tag sections of the selected four lines Ls are inputted to the four comparators in the comparing section 33, respectively. Each of the four comparators in the comparing section 33 compares the inputted frame address FA with the inputted frame address data of the tag section, and outputs a comparison result signal C. If there is the frame address data of the tag section which has matched with the inputted frame address FA, the comparing section 33 outputs any of the match signals c0 to c3 indicating that the cache hit has been detected. The comparing section 33 constitutes a cache hit detecting section configured to detect the cache hit in each way.

The match signals c0 to c3 indicating the detection of the cache hit correspond to the four ways #0 to #3, respectively, and are signals indicating that the frame address FA and the frame address data of the tag section have matched with each other.

Therefore, if the inputted frame address FA and the inputted frame address data of the tag section have not matched with each other, none of the match signals c0 to c3 are outputted. If any inputted frame address FA and any inputted frame address data of the tag section have matched with each other, one match signal corresponding to one way in which the frame address FA and the frame address data of the tag section have matched with each other is outputted.

The match signals c0 to c3 are inputted to the way selector section 35. The way selector section 35 is a circuit configured to output the word data (D) of the line of the way corresponding to the match signal, in the word data inputted from the word selector section 34.

Moreover, if the chip enable signal CE is inputted, the selecting section 42 outputs the way enable signal WE configured to select and enable each one way (in a case of the 400 MHz mode to be described later) or each two ways (in a case of the 200 MHz mode to be described later) in the predetermined order. It should be noted that if the chip enable signal CE is inputted, the selecting section 42 may also output the way enable signal WE configured to simultaneously select and enable all the ways (in a case of the 100 MHz mode to be described later).

If the match signal is inputted, the controlling section 41 outputs the control signal CS to the selecting section 42 to stop the outputting of the way enable signal WE. Therefore, the control signal CS is a stop instruction signal configured to stop the selection of the way by the selecting section 42 in the middle of the selection if the cache hit is detected.

The division number designating section 43 includes a division number table DT as shown in FIG. 4, and with reference to the division number table DT, outputs the division number data corresponding to the inputted operating frequency data F.

FIG. 4 is a diagram showing an example of the division number table DT. As shown in FIG. 4, the division number table DT is a table in which one or more division numbers have been set and stored for each operating frequency, here, for each of 400 MHz, 200 MHz and 100 MHz. Furthermore, in the division number table DT, the division number data has been set along with priority data, for each operating frequency.

As shown in FIG. 4, if the operating frequency F of the CPU core 15 is 100 MHz, three division numbers "4", "2" and "1" corresponding to three priorities "1", "2" and "3" are set. If the operating frequency F of the CPU core 15 is 200 MHz, two division numbers "2" and "1" corresponding to two priorities "1" and "2" are set. If the operating frequency F of the CPU core 15 is 400 MHz, one division number "1" corresponding to one priority "1" is set.

In the present embodiment, if the operating frequency F of the CPU core 15 is designated, the division number designating section 43 typically selects data of the division number corresponding to a highest priority, here "1", and outputs the data to the selecting section 42. For example, if the operating frequency F of the CPU core 15 is 100 MHz, the division number designating section 43 outputs the division number data indicating the division number "4" corresponding to the highest priority "1", to the selecting section 42.

It should be noted that the user may be able to select the division number. In other words, for the operating frequency F of the CPU core 15, the user may designate and select the division number corresponding to the priority other than the highest priority. For example, if the operating frequency F of the CPU core 15 is 100 MHz, the user may set the division number designating section 43 to output the division number data indicating the division number "2" corresponding to the priority "2", to the selecting section 42.

As described above, the division number designating section 43 outputs data designating the division number corresponding to the operating frequency F of the CPU core 15 which has been set, to the selecting section 42.

In addition, the selecting section 42 divides one CPU cycle by the designated division number, and outputs the way enable signal WE configured to select each way or the plurality of ways, within each divided period, to each way.

In addition, when receiving the division number change signal DNC from the above described division number changing section 16b, the division number designating section 43 changes the access mode in which the operation has been performed until then, regardless of the division number and the priority which have been designated.

2. Operations

Next, operations of the cache memory 16 in the above described processor 1 will be described.

2.1 Operations without Mode Change

FIGS. 5A to 5F are timing charts for explaining operations of the processor 1. The cache memory 16 operates at 400 MHz as described above. Hereinafter, a case where the operating frequency F of the CPU core 15 has been set to 100 MHz will be described.

If the user sets the operating frequency F of the CPU core 15 to 100 MHz, the set operating frequency data F is stored in the frequency setting register 17 (in FIG. 1), and outputted to the division number designating section 43 via the CPU core 15. With reference to the division number table DT, the division number designating section 43 outputs the division number data corresponding to the highest priority, to the selecting section 42. The selecting section 42 outputs the way enable signal WE to each way so that one CPU cycle is divided by the inputted division number.

Therefore, if the operating frequency F of the CPU core 15 is set to 100 MHz, each way is selected through the division into four corresponding to the highest priority "1" (in the 400 MHz mode to be described later).

It should be noted that if the operating frequency F of the CPU core 15 is set to 200 MHz, each way is selected through the division into two corresponding to the highest priority "1". Furthermore, if the operating frequency F of the CPU core 15 is set to 400 MHz, each way is selected through the division into one corresponding to the highest priority "1" (that is, no division is performed), that is, all the ways are simultaneously selected.

As described above, since one CPU cycle is divided depending on the operating frequency of the CPU core 15 connected to the cache memory 16, the number of ways to be selected in one selection by the selecting section 42 is changed.

A specific description is provided by using FIGS. 5A to 5F. If the operating frequency F of the CPU core 15 is set to 100 MHz, a system clock CLK of the processor 1 is 400 MHz, and the CPU core 15 operates at 100 MHz. Since the cache memory 16 operates at 400 MHz, a frequency ratio of the CPU core 15 to the cache memory 16 is 1:4.

Since the operating frequency data F of 100 MHz is inputted to the division number designating section 43, with reference to the division number table DT, the division number data of the division number "4" corresponding to the highest priority "1" is outputted to the selecting section 42.

As a result, when receiving the chip enable signal CE, the selecting section 42 starts an operation so as to output way enable signals WE[0], WE[1], WE[2] and WE[3], one by one in order. In other words, the cache memory 16 attempts to execute comparison of the inputted frame address FA in the real address data RA with the frame address of the tag section of each way, in order, in one CPU cycle. Here, the comparison is performed in order of the ways #0 to #3.

First, the way enable signal WE[0] corresponding to the way #0 is set to HIGH, and the comparison is performed to see whether the frame address of the tag section read from the way #0 matches with the inputted frame address FA. In a case of the match, in the comparison result signal C, the match signal c0 becomes HIGH, indicating the cache hit.

In FIG. 5D, as the way enable signal WE for the ways #0 to #3, "1" indicating "0001" is outputted. In addition, as the comparison result signal C of the four match signals c0 to c3, "1" indicating "0001" is outputted. In "0001" of the comparison result signal C, a cache hit [0] signal is indicated by "1".

In an example of FIGS. 5A to 5F, when the frame address of the tag section stored in the way #0 has been compared with the inputted frame address FA, the match, that is, the hit has occurred. Therefore, after the match, the data to the CPU core 15 becomes "Valid". Consequently, the CPU core 15 captures the output of the way selector section 35 as the read data at a timing of a rising of a next CPU cycle, and thereby obtains the data cached in the way #0.

Moreover, since the comparison result signal C is inputted to the controlling section 41, the controlling section 41 can detect the cache hit. When detecting the cache hit, the controlling section 41 outputs the control signal CS for stopping the outputting of the way enable signal WE, to the selecting section 42. After receiving the control signal CS, the selecting section 42 stops the outputting of the way enable signal WE. Hence, when receiving the control signal CS, the selecting section 42 stops subsequent outputting of the way enable signal WE, which thereby suppresses unnecessary reading of tag data.

In other words, although the way enable signal WE[0] has become HIGH and thereby the way #0 has operated, thereafter, the way enable signals WE[1] to WE[3] do not become HIGH, and the ways #1 to #3 do not operate. Hence, power consumption related to cache accesses can be suppressed.

It should be noted that if the frame address of the tag section read from the way #0 has not matched with the inputted frame address FA, a miss access occurs in the cache memory 16. Next, the way enable signal WE[1] corresponding to the way #1 is set to HIGH, and the comparison is performed to see whether the frame address of the tag section read from the way #1 matches with the inputted frame address FA.

In the case of the match, in the comparison result signal C, the match signal c1 becomes HIGH, indicating the cache hit. In a case of the mismatch, the miss access occurs, and next, the way enable signal WE[2] corresponding to the way #2 is set to HIGH, and the comparison is performed to see whether the frame address of the tag section read from the way #2 matches with the inputted frame address FA. Hereinafter, similarly, it is checked whether or not the cache hit has occurred, up to the way #3.

FIGS. 6A to 6F are timing charts in a case where the cache hit has occurred in the way #3. The selecting section 42 outputs the way enable signals WE[0] to WE[3] in order, and thereby selects the ways #0 to #3 in order, in each divided period. The cache hit has occurred first in the way #3. In FIG. 6D, as the way enable signal WE, "1", "2", "4" and "8" indicating "0001", "0010", "0100" and "1000", respectively, are outputted in order.

In addition, in the comparison result signal C, the match signal c3 becomes HIGH, indicating the cache hit. In FIG. 6E, as a cache hit [3] signal, "8" indicating "1000" is outputted in a last divided period of one CPU cycle.

Therefore, if the cache hit occurs at a timing of the way enable signal WE[1] or WE[2], the selecting section 42 does not output the way enable signal WE after the cache hit. Thereafter, the way enable signal WE does not become HIGH, and the power consumption related to the cache accesses can be suppressed.

As described above, the cache memory 16 attempts to execute the tag comparison four times for the four ways, in the predetermined order, here, in order of the ways #0 to #3, in one CPU cycle. However, if the cache hit occurs somewhere in the middle of the four times, the way enable signal WE is not outputted thereafter. Hence, power consumption related to subsequent way operations can be suppressed.

Moreover, the above described example is a case where the operating frequency F of the CPU core 15 is 100 MHz, the division number "4" of the priority "1" is set, and the cache memory 16 operates in a sequential access mode in which each way is enabled in order.

However, if the operating frequency F of the CPU core 15 has been set to 400 MHz, one CPU cycle cannot be divided, and the cache memory 16 simultaneously outputs the way enable signals WE[0] to WE[3] to the four ways in one CPU cycle, and operates in a normal access mode in which the four ways are simultaneously enabled.

Moreover, the cache memory 16 can operate in an access mode which is an intermediate mode different from the sequential access mode and the normal access mode.

Specifically, in a case of FIG. 4, if the operating frequency F of the CPU core 15 is 100 MHz, and the user has designated the division number "2" corresponding to the priority "2", or if the operating frequency F of the CPU core 15 has been set to 200 MHz, and the division number "2" of the priority "1" has been designated, the cache memory 16 operates in the intermediate mode (the 200 MHz mode to be described later).

In such a case, the selecting section 42 simultaneously outputs the way enable signals WE[0] and WE[1] in a former half of one CPU cycle, and simultaneously outputs the way enable signals WE[2] and WE[3] in a latter half of one CPU cycle.

FIG. 7 is a diagram for conceptually explaining a power consumption state in three access modes including the normal access mode NM, the sequential access mode SM and the intermediate mode IM.

In the normal access mode NM, as shown in FIG. 7, since the four ways are simultaneously enabled, the power consumption is not reduced in comparison with a conventional case.

The normal access mode NM is a case where the division number is "1" in the division number table DT. In the above described example, the normal access mode NM is a case where the CPU core 15 operates at 100 MHz and the division number "1" corresponding to the priority "3" has been designated, a case where the CPU core 15 operates at 200 MHz and the division number "1" corresponding to the priority "2" has been designated, and a case where the CPU core 15 operates at 400 MHz and the division number "1" corresponding to the priority "1" has been designated.

In the sequential access mode SM, as shown in FIG. 7, since the ways are enabled one by one in the predetermined order, the power consumption can be reduced compared with that in the normal access mode.

In the present embodiment, since there are the four ways, the sequential access mode SM is a case where the division number is "4" in the division number table DT. In the above described example, the sequential access mode SM is a case where the CPU core 15 operates at 100 MHz and the division number "4" corresponding to the priority "1" has been designated.

In the sequential access mode SM, as described above, since each way is enabled in order and thus the cache hit may occur somewhere in the middle, the power consumption can be reduced more than in the normal access mode. The above described case of FIGS. 5A to 5F is a best case where a power consumption reduction effect is large. In such a case, the tag comparison is performed only once, and the power consumption is reduced to approximately one fourth of the power consumption in the normal access mode.

The above described case of FIGS. 6A to 6F is a worst case where the power consumption reduction effect is not large. In such a case, although the tag comparison is executed four times, the comparison is executed four times in one CPU cycle, and thus access latency is not increased from a viewpoint of the CPU core 15 operating at 100 MHz.

Moreover, in FIG. 7, in the intermediate mode IM, as shown in FIG. 7, if the cache hit occurs in a former half of the ways divided into two, the power consumption can be reduced to approximately one half of the power consumption in the normal access mode.

In the present embodiment, since there are the four ways, the intermediate mode IM is a case where the division number is "2" in the division number table DT. In the above described example, the intermediate mode IM is the case where the CPU core 15 operates at 100 MHz and the division number "2" corresponding to the priority "2" has been designated, and the case where the CPU core 15 operates at 200 MHz and the division number "2" corresponding to the priority "1" has been designated.

In the case of the intermediate mode IM, since each two ways are enabled in order and thus the cache hit may occur somewhere in the middle, the power consumption can be reduced compared with that in the normal access mode NM. Furthermore, in the case of the intermediate mode IM, although the tag comparison is executed twice, the comparison is executed twice in one CPU cycle, and thus the access latency is not increased from the viewpoint of the CPU core 15.

As described above, in the cache memory according to the above described embodiment, the selecting section 42 outputs the plurality of way enable signals WE for the plurality of ways, one by one, or outputs multiple way enable signals WE each time, in the predetermined order, in one CPU cycle. In addition, if the cache hit has occurred somewhere in the middle, the outputting of the way enable signal WE is stopped. As a result, the cache memory operates with lowest possible power consumption, without increasing the access latency.

2.2 Operations of Access Mode Change, that is, Division Number Change

Next, operations with the access mode change, that is, with the division number change, will be described.

First, an operation when an operation timing margin is large, that is, when there is a margin in the timing, in a case where the operation is performed in an access mode in which the plurality of ways in the cache memory 16 are divided into each one, here into four, and are accessed, will be described. It should be noted that when the plurality of ways are accessed one by one, the access is performed at a clock timing of 400 MHz, and thus the access mode is hereinafter referred to as "400 MHz mode". Similarly, an access mode in which the access is performed at a clock timing of 200 MHz is hereinafter referred to as "200 MHz mode", and an access mode in which the access is performed at a clock timing of 100 MHz is hereinafter referred to as "100 MHz mode", respectively. Furthermore, in the following description, the data of the four ways #0 to #3 are set as W0 to W3, respectively. Moreover, a data capture timing is a time of a rising edge of each period. For example, times of rising edges of periods t1, t2, t3 and t4 are set as T1, T2, T3 and T4.

FIGS. 8A to 8G are timing charts showing states of the input data and the output data of the FFs 51 and 52, and the output of the comparator 61, when the cache memory 16 operates in the 400 MHz mode and the operation timing margin is large. In FIGS. 8A to 8G, the periods t1 to t4 are one CPU cycle in the CPU core 15.

The data W0 of the way #0, which is the read data that is the output of the way selector section 35, is inputted to the FF 51 without delay, and is inputted to the FF 52 with a delay corresponding to a delay of the buffer circuit 52a. Then, the input data of the FF 52 has been decided on sufficiently earlier than the time of the rising edge T2 of the period t2, which is the data capture timing of the FF 52. Therefore, in the period t2, the output data of the FF 51 and the output data of the FF 52 are identical to each other. Consequently, the output of the comparator 61 is "0".

Also in the subsequent periods t2 to t4, since the data W1 to W3 which is the input data to the FF 51 and the FF 52 has been decided on sufficiently earlier at the respective data capture timings, the output of the comparator 61 is "0".

Since the cache memory 16 operates in the 400 MHz mode and the output of the comparator 61 in the period t2 is "0", the sequential circuit 63 assumes that there is no timing violation in the 400 MHz mode, and does not output the division number change signal DNC to the division number designating section 43 in the cache access controller 16a. As a result, as the access mode of the cache memory 16, the 400 MHz mode is maintained, as indicated by the arrow TM44 of FIG. 25.

It should be noted that, then, the sequential circuit 63 may output a signal indicating that there is no timing violation in the 400 MHz mode. It should be further noted that, of course, since there is no timing violation either in the access mode at 200 MHz (hereinafter referred to as "200 MHz mode"), the sequential circuit 63 may also output a signal indicating that there is no timing violation in the 200 MHz mode. In addition, in the division number designating section 43, the access mode may be changed based on the current access mode of the cache memory 16 and the signal indicating whether or not there is the timing violation. The same applies to operations at the time of the access modes to be described below.

a) When Operation Timing Margin at 400 MHz is Small in 400 MHz Mode (in Case of Arrow TM42 of FIG. 25)

Next, an operation when the operation timing margin is small and there is the timing violation, in a case where the cache memory 16 operates in the 400 MHz mode (the division number is 4), will be described.

FIGS. 9A to 9G are timing charts showing the states of the input data and the output data of the FFs 51 and 52, and the output of the comparator 61, when the cache memory 16 operates in the 400 MHz mode and the operation timing margin is small.

Due to the increase in the chip temperature or the like, the data W0, which is the read data that is the output of the way selector section 35, is inputted to the FF 51 with a delay, as indicated by an arrow A1, and is close to T2 which is the data capture timing of the FF 51. On the other hand, the data W0 is inputted to the FF 52 with the delay corresponding to the delay of the buffer circuit 52a, and the data W0 has not been decided on at T2 which is the data capture timing of the FF 52. The data W0 is decided on and captured at T3 which is the rising edge of the period t3. As a result, in the period t2, the output data of the FF 51 and the output data of the FF 52 mismatch with each other. Consequently, the output of the comparator 61 is "1".

Since the cache memory 16 operates in the 400 MHz mode, and the output of the comparator 61 in the period t2 is "1", the sequential circuit 63 assumes that there is the timing violation in the 400 MHz mode, and outputs the division number change signal DNC to the division number designating section 43 in the cache access controller 16a. In other words, the sequential circuit 63 as the determining section determines to decrease the division number, based on information on the mismatch and information on the period that is timing information on the mismatch, which are comparison results from the plurality of comparators, and outputs the division number change signal DNC configured to change the division number from 4 to 2.

As a result, since the cache memory 16 operates in the 400 MHz mode, and the output of the comparator 61 in the period t2 is "1", the division number designating section 43 changes the access mode so that the division number is decreased from 4 to 2, as indicated by the arrow TM42 of FIG. 25. It should be noted that the division number change is performed in and after a next one CPU cycle following the period t4, in FIGS. 9A to 9G. For example, the cache access controller 16a shifts the access mode to the 200 MHz mode, in a next one CPU cycle after completion of the read operation.

b) When Operation Timing Margin in 400 MHz Mode is Small and Operation Timing Margin in 200 MHz Mode is Large in 200 MHz Mode (in Case of Arrow TM22 of FIG. 25)

Next, an operation when the operation timing margin in the 400 MHz mode is small and the operation timing margin in the 200 MHz mode is large, in a case where the cache memory 16 operates in the 200 MHz mode (the division number is 2), will be described.

FIGS. 10A to 10L are timing charts showing states of the input data and the output data of the FFs 51 to 54, and the outputs of the comparators 61 and 62, when the cache memory 16 operates in the 200 MHz mode, the operation timing margin in the 400 MHz mode is small, and the operation timing margin in the 200 MHz mode is large.

Due to the increase in the chip temperature or the like, the read data which is the output of the way selector section 35 is inputted to the FF 53 with a delay, as indicated by an arrow A2, and is inputted to the FF 54 with a delay corresponding to a delay of the buffer circuit 54a. However, the input data of the FFs 53 and 54, which is either the data W0 of the way #0 or the data W1 of the way #1, has been decided on at the time of the rising edge of the period t3, which is the data capture timing of the FFs 53 and 54. Consequently, the input data of the FFs 53 and 54 is captured at the rising edge of the period t3. As a result, in the period t3, the output data of the FF 53 and the output data of the FF 54 match with each other. Consequently, the output of the comparator 62 is "0". Also in the periods t4 and t5, the output of the comparator 62 is "0".

Since the cache memory 16 operates in the 200 MHz mode, and the output of the comparator 62 in the period t3 is "0", the sequential circuit 63 assumes that there is no timing violation in the 200 MHz mode, and does not output the division number change signal DNC to the division number designating section 43 in the cache access controller 16a.

On the other hand, also with respect to the FFs 51 and 52, the read data which is the output of the way selector section 35 is inputted to the FF 51 with the delay, as indicated by the arrow A2, and is inputted to the FF 52 with the delay corresponding to the delay of the buffer circuit 52a. The input data of the FF 52 is an indefinite value at the time of the rising edge T2 of the period t2, which is the data capture timing of the FF 52. As a result, in the period t2, the output data of the FF 51 and the output data of the FF 52 mismatch with each other, and the output of the comparator 61 is "1".

However, the input data of the FFs 51 and 52 has been decided on at the time of the rising edge T3 of the next period t3. In the period t3, the output data of the FF 51 and the output data of the FF 52 are identical to each other, and the output of the comparator 61 is "0".

Furthermore, in the following period t4, in the FF 51, next read data (W2/3), that is, either the data W2 of the way #2 or the data W3 of the way #3, has been decided on at the time of the rising edge T4 of the period t4, which is the data capture timing of the FF 51. On the other hand, at the time of the rising edge T4 of the period t4, the next read data (W2/3) has not yet been inputted to the FF 52, and the input data of the FF 52 is previous read data (W0/1), that is, either the data W0 of the way #0 or the data W1 of the way #1. Consequently, in the period t4, the output data of the FF 51 and the output data of the FF 52 mismatch with each other, and the output of the comparator 61 is "1".

The next period t5 following the period t4 is similar to a case of the period t3, and the output of the comparator 61 is "0".

As described above, since the cache memory 16 operates in the 200 MHz mode, and the output of the comparator 62 is "0" in the period t3, the sequential circuit 63 assumes that the operation timing margin in the 400 MHz mode is small while the operation timing margin in the 200 MHz mode is large, and does not output the division number change signal DNC configured to change the access mode, to the division number designating section 43 in the cache access controller 16a. As a result, the cache access controller 16a maintains the 200 MHz mode, as indicated by the arrow TM22 of FIG. 25.

c) When Operation Timing Margin in 200 MHz Mode is Small in 200 MHz Mode (in Case of Arrow TM21 of FIG. 25)

Next, an operation when the operation timing margin in the 200 MHz mode is small, in the case where the cache memory 16 operates in the 200 MHz mode (the division number is 2), will be described.

FIGS. 11A to 11L are timing charts showing the states of the input data and the output data of the FFs 51 to 54, and the outputs of the comparators 61 and 62, when the cache memory 16 operates in the 200 MHz mode and the operation timing margin in the 200 MHz mode is small.

Due to a further increase in the chip temperature or the like, the read data which is the output of the way selector section 35, that is, either the data W0 of the way #0 or the data W1 of the way #1, is inputted to the FF 53 with a large delay, as indicated by an arrow A3. The read data is inputted to the FF 54 with a further delay corresponding to the delay of the buffer circuit 54a. The input data of the FF 53 has been decided on at the time of the rising edge T3 of the period t3, which is the data capture timing of the FF 53. However, the input data of the FF 54 is an indefinite value that has not been decided on at the time of the rising edge T3 of the period t3, which is the data capture timing of the FF 54. As a result, in the periods t3 and t4, the output data of the FF 53 and the output data of the FF 54 mismatch with each other, and the output of the comparator 62 is "1".

Since the cache memory 16 operates in the 200 MHz mode, and the output of the comparator 62 in the period t3 is "1", the sequential circuit 63 assumes that there is the timing violation in the 200 MHz mode, and outputs the division number change signal DNC to the division number designating section 43 in the cache access controller 16a. In other words, a signal configured to change the division number from 2 to 1 is outputted.

At a time of a rising edge T5 of the period t5, the input data of the FF 53 has been decided on to be either the data W2 of the way #2 or the data W3 of the way #3. However, the input data of the FF 54 is still either the data W0 of the way #0 or the data W1 of the way #1. Therefore, the output of the comparator 62 is "1".

On the other hand, also with respect to the FFs 51 and 52, the read data which is the output of the way selector section 35 is inputted to the FF 51 with the large delay, as indicated by the arrow A3, and is inputted to the FF 52 with a further delay corresponding to the delay of the buffer circuit 52a. Since the output data of the FF 51 and the FF 52 has not been decided on in the period t2, the output of the comparator 61 is "1".

The input data of the FF 51 has been decided on at the time of the rising edge T3 of the period t3, which is the data capture timing of the FF 51. However, the input data of the FF 52 has not been decided on at the time of the rising edge T3 of the period t3, which is the data capture timing of the FF 52. As a result, in the period t3, the output data of the FF 51 and the output data of the FF 52 mismatch with each other. Consequently, the output of the comparator 61 is "1".

However, the input data of the FFs 51 and 52 has been decided on at the time of the rising edge T4 of the next period t4, and in the period t4, the output data of the FF 51 and the output data of the FF 52 are identical to each other. Consequently, the output of the comparator 61 is "0".

Furthermore, in the next period t5 following the period t4, the next read data (W2/3), that is, either the data W2 of the way #2 or the data W3 of the way #3, is inputted to the FF 51, and has been decided on at the time of the rising edge T5 of the period t5, which is the data capture timing of the FF 51. However, at the time of the rising edge T5 of the next period t5, the next read data (W2/3) has not yet been inputted to the FF 52, and the input data of the FF 52 is the previous read data (W0/1). Consequently, in the next period t5, the output data of the FF 51 and the output data of the FF 52 mismatch with each other. Consequently, the output of the comparator 61 is "1".

A next period following the period t5 is similar to a case of the period t4, and the output of the comparator 61 is "0".

Since the cache memory 16 operates in the 200 MHz mode, and the output of the comparator 62 is "1" in the period t3, the sequential circuit 63 assumes that the operation timing margin in the 200 MHz mode is small, and outputs the division number change signal DNC to the division number designating section 43 in the cache access controller 16a. In other words, the signal configured to change the division number from 2 to 1 is outputted. As a result, the cache access controller 16a changes the access mode to the 100 MHz mode, as indicated by the arrow TM21 of FIG. 25.

d) When Both Operation Timing Margins in 200 MHz Mode and 400 MHz Mode are Large in 200 MHz Mode (in Case of Arrow TM24 of FIG. 25)

Next, an operation when both the operation timing margins in the 200 MHz mode and the 400 MHz mode are large, in the case where the cache memory 16 operates in the 200 MHz mode (the division number is 2), will be described.

FIGS. 12A to 12L are timing charts showing the states of the input data and the output data of the FFs 51 to 54, and the outputs of the comparators 61 and 62, when the cache memory 16 operates in the 200 MHz mode and both the operation timing margins in the 200 MHz mode and the 400 MHz mode are large. This is a case where, although an operation state has worsened and the access mode has shifted from the 400 MHz mode to the 200 MHz mode in the past, the operation state has been improved thereafter.

Due to a subsequent decrease in the chip temperature or the like, the read data which is the output of the way selector section 35 is inputted to the FF 53 with a delay, as indicated by an arrow A4, and is inputted to the FF 54 with the further delay corresponding to the delay of the buffer circuit 54a. However, the input data of the FFs 53 and 54 has been decided on at the time of the rising edge T3 of the period t3, which is the data capture timing of the FFs 53 and 54. As a result, in the periods t3 and t4, the output data of the FF 53 and the output data of the FF 54 match with each other. Consequently, the output of the comparator 62 is "0".

A similar operation is also performed in the next period following the periods t3 and t4.

On the other hand, also with respect to the FFs 51 and 52, the read data which is the output of the way selector section 35 is inputted to the FF 51 with the delay, as indicated by the arrow A4, and is inputted to the FF 52 with the further delay corresponding to the delay of the buffer circuit 52a. The input data of the FFs 51 and 52 has been decided on at the time of the rising edge T2 of the period t2, which is the data capture timing of each of the FFs 51 and 52. As a result, in the period t2, the output data of the FF 51 and the output data of the FF 52 match with each other. Consequently, the output of the comparator 61 is "0".

Also in the next period t3 following the period t2, the same data is inputted to the FFs 51 and 52. Therefore, similarly to a case of the period t2, the output of the comparator 61 is "0".

The next period following the period t3, and subsequent periods are also similar to the cases of the periods t2 and t3, and the output of the comparator 61 is "0".

Since the cache memory 16 operates in the 200 MHz mode, and the output of the comparator 61 is "0" in the period t2, the sequential circuit 63 assumes that the two operation timing margins in the 200 MHz mode and the 400 MHz mode are large, and outputs the division number change signal DNC configured to change the access mode, to the division number designating section 43 in the cache access controller 16a.

In other words, the sequential circuit 63 as the determining section determines to increase the division number, based on information on the match and the period that is timing information on the match, which are the comparison results from the plurality of comparators, and outputs the division number change signal DNC configured to change the division number from 2 to 4. As a result, the cache access controller 16a changes the access mode to the 400 MHz mode in and after a next one CPU cycle, as indicated by the arrow TM24 of FIG. 25.

e) When Operation Timing Margin in 200 MHz Mode is Small in 100 MHz Mode (in Case of Arrow TM11 of FIG. 25)

Next, an operation when the operation timing margin in the 200 MHz mode is small, in a case where the cache memory 16 operates in the 100 MHz mode (the division number is 1), will be described.

FIGS. 13A to 13L are timing charts showing the states of the input data and the output data of the FFs 51 to 54, and the outputs of the comparators 61 and 62, when the cache memory 16 operates in the 100 MHz mode and the operation timing margin in the 200 MHz mode is small. This is a case where the operation state has worsened and the access mode has shifted to the 100 MHz mode in the past, and the operation state has not yet been improved thereafter.

The read data D which is the output of the way selector section 35, that is, any one of the data W0 of the way #0, the data W1 of the way #1, the data W2 of the way #2, and the data W3 of the way #3 is inputted to the FF 53 with a delay, as indicated by an arrow A5, and is inputted to the FF 54 with the further delay corresponding to the delay of the buffer circuit 54a. Nevertheless, the input data of the FF 53 has been decided on at the time of the rising edge T3 of the period t3, which is the data capture timing of the FF 53. However, the input data of the FF 54 has not been decided on at the time of the rising edge T3 of the period t3, which is the data capture timing of the FF 54. As a result, in the periods t3 and t4, the output data of the FF 53 and the output data of the FF 54 mismatch with each other. Consequently, the output of the comparator 62 is "1".

However, the input data of the FFs 53 and 54 has been decided on at the time of the rising edge T5 of the period t5, which is the data capture timing of the FFs 53 and 54. As a result, in the period t5 following the periods t3 and t4, and in a next period, the output data of the FF 53 and the output data of the FF 54 match with each other. Consequently, the output of the comparator 62 is "b 0".

In addition, a similar operation is also performed in the period t5 following the periods t3 and t4, and in subsequent periods.

On the other hand, also with respect to the FFs 51 and 52, the read data which is the output of the way selector section 35 is inputted to the FF 51 with the delay, as indicated by the arrow A5, and is inputted to the FF 52 with the further delay corresponding to the delay of the buffer circuit 52a. The input data of the FFs 51 and 52 has not been decided on at the time of the rising edge T2 of the period t2, which is the data capture timing of each of the FFs 51 and 52, and is an indefinite value. Therefore, in the period t2, the output data of the FF 51 and the output data of the FF 52 mismatch with each other, and the output of the comparator 61 is "1".

The input data of the FF 51 has been decided on at the time of the rising edge T3 of the period t3, which is the data capture timing of the FF 51. However, the input data of the FF 52 has not been decided on at T3 and is the indefinite value. Therefore, in the period t3, the output data of the FF 51 and the output data of the FF 52 mismatch with each other, and the output of the comparator 61 is "1".

In the next period t4 following the period t3, the input data of each of the FFs 51 and 52 has been decided on, and the same data is inputted. Therefore, the output of the comparator 61 is "0".

Also in the next period t5 following the period t4, and in the next period, the output data of the FF 51 and the output data of the FF 52 match with each other. Therefore, the output of the comparator 61 is "0".

Since the cache memory 16 operates in the 100 MHz mode, and the output of the comparator 62 is "1" in the period t3, the sequential circuit 63 assumes that the operation timing margin in the 200 MHz mode is small, and does not output the division number change signal DNC configured to change the access mode, to the division number designating section 43 in the cache access controller 16a. As a result, the cache access controller 16a maintains the access mode as the 100 MHz mode, as indicated by the arrow TM11 of FIG. 25.

f) When Operation Timing Margin in 200 MHz Mode is Large in 100 MHz Mode (in Case of Arrow TM12 of FIG. 25)

Next, an operation when the operation timing margin in the 200 MHz mode is large, in the case where the cache memory 16 operates in the 100 MHz mode (the division number is 1), will be described.

FIGS. 14A to 14L are timing charts showing the states of the input data and the output data of the FFs 51 to 54, and the outputs of the comparators 61 and 62, when the cache memory 16 operates in the 100 MHz mode and the operation timing margin in the 200 MHz mode is large. This is a case where the operation state has worsened and the access mode has shifted to the 100 MHz mode in the past, and the operation state has been improved thereafter.

The read data which is the output of the way selector section 35 is inputted to the FF 53 with a delay, as indicated by an arrow A6, and is inputted to the FF 54 with the further delay corresponding to the delay of the buffer circuit 54a. However, the input data of the FF 53 and the input data of the FF 54 have been decided on at the time of the rising edge T3 of the period t3, which is the data capture timing of the FF 53 and the FF 54. As a result, in the periods t3 and t4, the output data of the FF 53 and the output data of the FF 54 match with each other. Therefore, the output of the comparator 62 is "0".

Moreover, the input data of the FFs 53 and 54 has also been decided on at the time of the rising edge T5 of the period t5, which is the data capture timing of the FFs 53 and 54. As a result, in the period t5 following the periods t3 and t4, and in the next period, the output data of the FF 53 and the output data of the FF 54 match with each other, and the output of the comparator 62 is "0".

On the other hand, also with respect to the FFs 51 and 52, the read data which is the output of the way selector section 35 is inputted to the FF 51 with the delay, as indicated by the arrow A6, and is inputted to the FF 52 with the further delay corresponding to the delay of the buffer circuit 52a. The input data of the FFs 51 and 52 has not been decided on at the time of the rising edge T2 of the period t2, which is the data capture timing of each of the FFs 51 and 52, and is an indefinite value. Therefore, in the period t2, the output data of the FF 51 and the output data of the FF 52 mismatch with each other, and the output of the comparator 61 is "1".

The input data of each of the FF 51 and the FF 52 has been decided on at the time of the rising edge T3 of the period t3, which is the data capture timing of the FF 51 and the FF 52. In the period t3, the output data of the FF 51 and the output data of the FF 52 match with each other. The output of the comparator 61 is "0".

Also in the next period t4 following the period t3, the input data of each of the FFs 51 and 52 has been decided on, and the same data is inputted. Therefore, the output of the comparator 61 is "0".

Also in the next period t5 following the period t4, and in the next period, the output data of the FF 51 and the output data of the FF 52 match with each other. Therefore, the output of the comparator 61 is "0".

Since the cache memory 16 operates in the 100 MHz mode, and the output of the comparator 62 is "0" in the period t3, the sequential circuit 63 assumes that the operation timing margin in the 200 MHz mode is large, and outputs the division number change signal DNC configured to change the access mode, to the division number designating section 43 in the cache access controller 16a. As a result, the cache access controller 16a changes the access mode to the 200 MHz mode, as indicated by the arrow TM12 of FIG. 25.

As described above, the sequential circuit 63 as the determining section determines to increase or decrease the division number, based on the information on the match or the mismatch, and the period that is the timing information on the match or the mismatch, which are the comparison results from the plurality of comparators, and outputs a required division number change signal DNC.

Therefore, when the cache hit occurs for the selection of the plurality of ways, a cache memory device of the present embodiment stops subsequent selection, and changes the access mode based on the output states of the plurality of comparators and the access mode of the cache memory 16. Therefore, the cache memory device of the present embodiment can operate with the lowest possible power consumption while having cache hit performance equivalent to the normal access mode.

Second Embodiment

Next, a second embodiment of the present invention will be described.

1. Configuration

In the first embodiment, the cache memory 16 has the plurality of, by way of example, two comparators in the division number changing section 16b, and detects the timing violation in a plurality of, by way of example, two access modes. In the present embodiment, instead of providing the plurality of comparators configured to detect the timing violation in the plurality of access modes, the division number change is performed based on an output pattern of a comparator configured to detect the timing violation in one access mode.

In the processor according to the present embodiment, the same constituent elements as in the first embodiment are assigned with the same reference characters, and descriptions thereof are omitted. In the processor of the present embodiment, the configuration of the division number changing section is different from that of processor 1 of FIG. 1.

Figure 15:
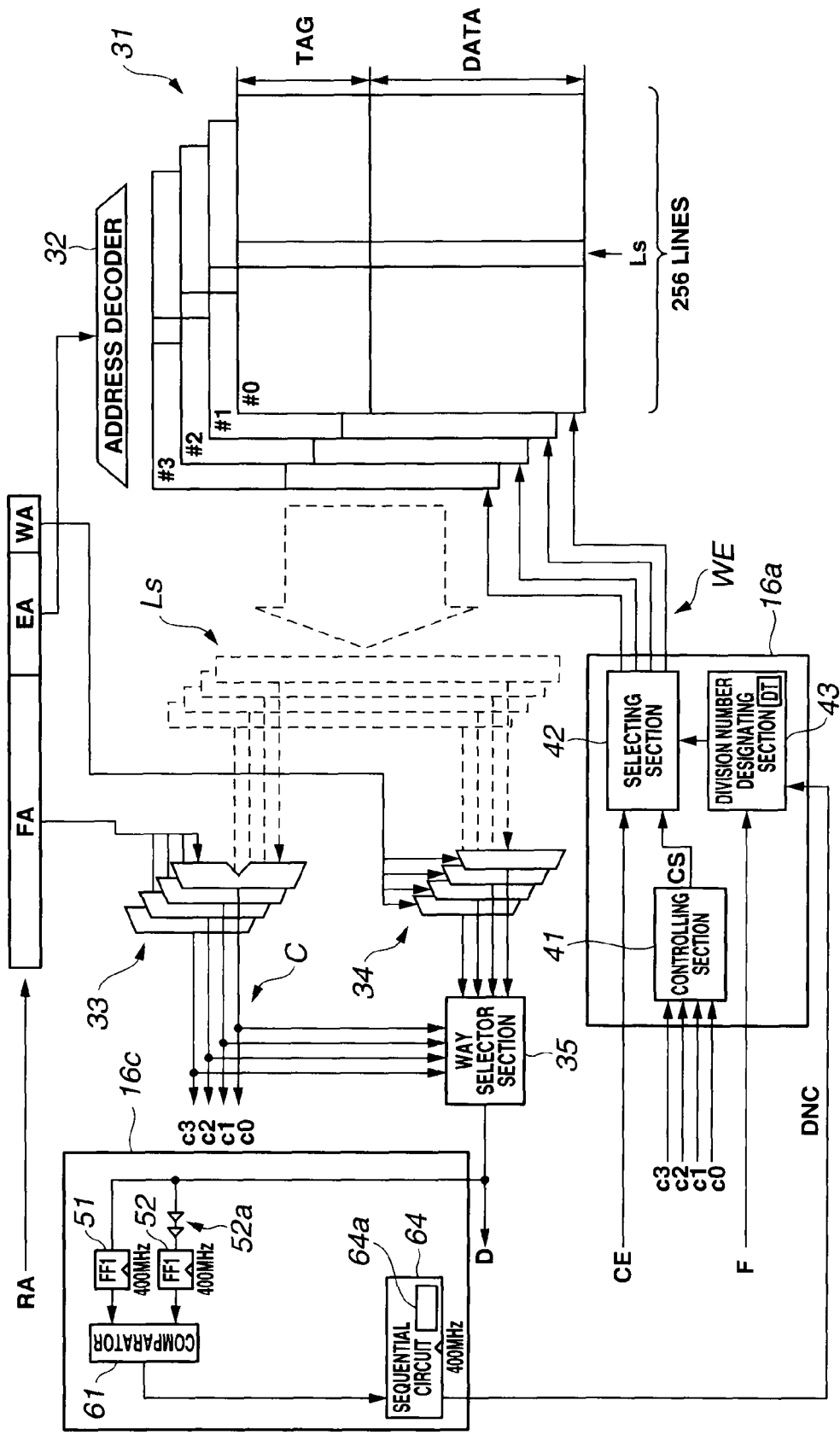
FIG. 15 is a diagram for explaining a configuration example of the cache memory according to a second embodiment of the present invention.

FIG. 15 is a diagram for explaining a configuration example of a cache memory 16A according to the second embodiment. In FIG. 15, the same constituent elements as in FIG. 3 are assigned with the same reference characters, and descriptions thereof are omitted.

As shown in FIG. 15, a division number changing section 16c includes the two FFs 51 and 52 configured to detect the timing violation at 400 MHz, the comparator 61, and a sequential circuit 64. In the division number changing section 16c, the FFs 53 and 54 operating at 200 MHz, and the comparator 62 connected to post-stages of the FFs 53 and 54 in FIG. 3 have been removed.

The sequential circuit 64 has a pattern data storing section 64a. Pattern data of the timing of the match or the mismatch has been previously stored in the pattern data storing section 64a. The sequential circuit 64 as the determining section compares the output pattern that is the timing information on the match or the mismatch inputted from the comparator 61, with the pattern data stored in the pattern data storing section 64a, and outputs the division number change signal DNC corresponding to the pattern data which has matched, to the division number designating section 43.

In the cache memory according to the present embodiment, the division number change is performed based on the pattern data stored in the pattern data storing section 64a.

Hereinafter, for each state of the access mode and the operation timing margin, an operation of the cache memory 16A based on the output pattern of the comparator 61 and the pattern data stored in the pattern data storing section 64a will be described.

2. Operations

First, it is judged that the cache access controller operates in the 400 MHz mode and the operation timing margin at 400 MHz is large, since the signal is "0" in the period t2 of the output pattern of the comparator 61 in the above described FIG. 8G.

In other words, data "0" in the period t2 is stored in the pattern data storing section 64a at the time of the 400 MHz mode, and the stored pattern data is compared with the output pattern of the comparator 61. In addition, then, since the operation timing margin at 400 MHz is large, the sequential circuit 64 does not output the division number change signal DNC. As a result, the cache access controller 16a maintains the access mode as the 400 MHz mode (in a case of the arrow TM44 of FIG. 25).

Consequently, the following pattern data P0 has been stored in the pattern data storing section 64a.

P0: * 0 * *

It should be noted that, in the above pattern data, "*" indicates that any value may be assigned, and values of the periods t1, t2, t3 and t4 are indicated in order (the same applies to the followings).

a) When Operation Timing Margin at 400 MHz is Small in 400 MHz Mode (in Case of Arrow TM42 of FIG. 25)

It is judged that the operation timing margin at 400 MHz is small when the operation is performed in the 400 MHz mode, since the output of the comparator 61 is "1" in the period t2 in the above described FIG. 9G.

Consequently, the following pattern data Pa has been stored in the pattern data storing section 64a.

Pa: * 1 * *

In other words, data "1" in the period t2 is stored in the pattern data storing section 64a at the time of the 400 MHz mode, and the stored pattern data is compared with the output pattern of the comparator 61. In addition, in a case of the above output pattern, since the operation timing margin at 400 MHz is small, the sequential circuit 64 outputs the division number change signal DNC. As a result, the cache access controller 16a shifts the access mode from the 400 MHz mode to the 200 MHz mode, as indicated by the arrow TM42 of FIG. 25.

b) When Operation Timing Margin in 400 MHz Mode is Small and Operation Timing Margin in 200 MHz Mode is Large in 200 MHz Mode (in Case of Arrow TM22 of FIG. 25)

It is judged that, when the operation is performed in the 200 MHz mode, the operation timing margin at 400 MHz is small (that is, there is the timing violation at 400 MHz) while the operation timing margin in the 200 MHz operation is large, since the output of the comparator 61 is "1" in the period t2 and is "0" in the period t3 in the above described FIG. 10L.

Consequently, the following pattern data Pb has been stored in the pattern data storing section 64a.

Pb: * 1 0 *

In other words, the data "1" in the period t2 and the data "0" in the period t3 are stored in the pattern data storing section 64a at the time of the 200 MHz mode, and the stored pattern data is compared with the output pattern of the comparator 61. In addition, in a case of the output pattern here, since the operation timing margin at 400 MHz is small and the operation timing margin in the 200 MHz mode is large, the sequential circuit 64 does not output the division number change signal DNC. As a result, the cache access controller 16a maintains the access mode as the 200 MHz mode, as indicated by the arrow TM22 of FIG. 25.

c) When Operation Timing Margin in 200 MHz Mode is Small in 200 MHz Mode (in Case of Arrow TM21 of FIG. 25)

It is judged that the operation timing margin in the 200 MHz operation is small when the operation is performed in the 200 MHz mode, since the output of the comparator 61 is "1" in the period t2 and is "1" in the period t3 in the above described FIG. 11L.

Consequently, the following pattern data Pc has been stored in the pattern data storing section 64a.

Pc: * 1 1 *

In other words, the data "1" in the period t2 and the data "1" in the period t3 are stored in the pattern data storing section 64a at the time of the 200 MHz mode, and the stored pattern data is compared with the output pattern of the comparator 61. In addition, in a case of the above output pattern, since the operation timing margin at 200 MHz is small, the sequential circuit 64 outputs the division number change signal DNC. As a result, the cache access controller 16a shifts the access mode from the 200 MHz mode to the 100 MHz mode, as indicated by the arrow TM21 of FIG. 25.

d) When Both Operation Timing Margins in 200 MHz Mode and 400 MHz Mode are Large in 200 MHz Mode (in Case of Arrow TM24 of FIG. 25)

It is judged that the operation timing margin at 400 MHz is large when the operation is performed in the 200 MHz mode, since the output of the comparator 61 is "0" in the period t2 in the above described FIG. 12L.

Consequently, the following pattern data Pd has been stored in the pattern data storing section 64a.

Pd: * 0 * *

In other words, the data "0" in the period t2 is stored in the pattern data storing section 64a at the time of the 200 MHz mode, and the stored pattern data is compared with the output pattern of the comparator 61. In addition, in a case of the above output pattern, since both the operation timing margins in the 200 MHz mode and the 400 MHz mode are large, the sequential circuit 64 outputs the division number change signal DNC. As a result, the cache access controller 16a shifts the access mode from the 200 MHz mode to the 400 MHz mode, as indicated by the arrow TM24 of FIG. 25.

e) When Operation Timing Margin in 200 MHz Mode is Small in 100 MHz Mode (in Case of Arrow TM11 of FIG. 25)

It is judged that the operation timing margin at 200 MHz is small when the operation is performed in the 100 MHz mode, since the output of the comparator 61 is "1" in the period t3 in the above described FIG. 13L.

Consequently, the following pattern data Pe has been stored in the pattern data storing section 64a.

Pe: * * 1 *

In other words, the data "1" in the period t3 is stored in the pattern data storing section 64a at the time of the 100 MHz mode, and the stored pattern data is compared with the output pattern of the comparator 61. In addition, in a case of the above output pattern, since the operation timing margin in the 200 MHz mode is small, the sequential circuit 64 does not output the division number change signal DNC. As a result, the cache access controller 16a maintains the access mode as the 100 MHz mode, as indicated by the arrow TM11 of FIG. 25.

f) When Operation Timing Margin in 200 MHz Mode is Large in 100 MHz Mode (in Case of Arrow TM12 of FIG. 25)

It is judged that the operation timing margin at 200 MHz is large when the operation is performed in the 100 MHz mode, since the output of the comparator 61 is "0" in the period t3 in the above described FIG. 14L.

Consequently, the following pattern data Pf has been stored in the pattern data storing section 64a.

Pf: * * 0 *

In other words, the data "0" in the period t3 is stored in the pattern data storing section 64a at the time of the 100 MHz mode, and the stored pattern data is compared with the output pattern of the comparator 61. In addition, in a case of the above output pattern, since the operation timing margin in the 200 MHz mode is large, the sequential circuit 64 outputs the division number change signal DNC. As a result, the cache access controller 16a shifts the access mode from the 100 MHz mode to the 200 MHz mode, as indicated by the arrow TM12 of FIG. 25.

As described above, the operation timing margin can be determined, and the access mode can be appropriately changed, by previously storing the pattern data, that is, pattern information, on the timing of the match or the mismatch as described above, for each access mode in the pattern data storing section 64a, and comparing the pattern data, that is, the pattern information, with the output pattern of the comparator 61, that is, the output pattern that is the timing information on the match or the mismatch between the read data.

Therefore, according to the present embodiment, even if the FFs and the comparator for the detection of one timing violation in the first embodiment are removed, advantages similar to those of the first embodiment can be obtained, and furthermore, hardware resources can be reduced in comparison with the first embodiment.

Third Embodiment

Next, a third embodiment of the present invention will be described.

1. Configuration

In the above described two embodiments, in order to detect the timing violation at 400 MHz and the timing violation at 200 MHz, the buffer circuit for the delay is provided at an input stage of one of the two FFs, and the comparison of the output data of the two FFs is performed. In contrast, in the present embodiment, instead of the comparator, a circuit configured to detect an error in data, for example, a parity check circuit, a CRC circuit or the like is used to judge whether the operation timing margin is large or small. The judgment uses a fact that the value retained by the FF in which the timing violation has occurred becomes an indefinite value, and consistency of data including an even-odd parity, a CRC or the like cannot be maintained.

In the processor according to the present embodiment, the same constituent elements as in the first embodiment are assigned with the same reference characters, and descriptions thereof are omitted. In the processor of the present embodiment, the configuration of the division number changing section is different from that of the processor 1 of FIG. 1.

Figure 16:
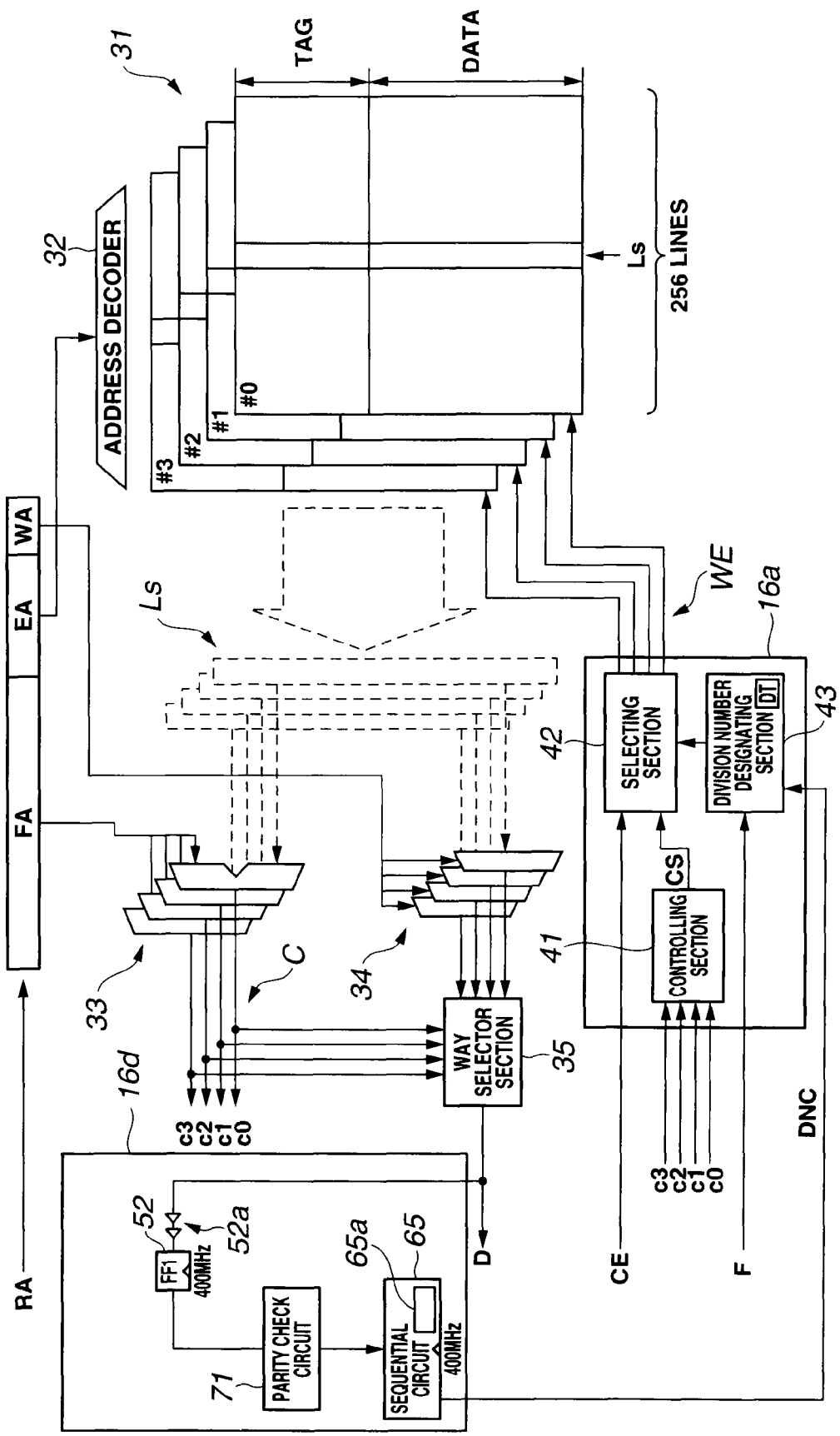
FIG. 16 is a diagram for explaining a configuration example of the cache memory according to a third embodiment of the present invention.

FIG. 16 is a diagram for explaining a configuration example of a cache memory 16B according to the third embodiment. In FIG. 16, the same constituent elements as in FIG. 3 are assigned with the same reference characters, and descriptions thereof are omitted.

As shown in FIG. 16, a division number changing section 16d includes the buffer circuit 52a for the delay, to which the read data is inputted, the FF 52 to which the output data of the buffer circuit 52a is inputted as the input data, a parity check circuit 71 to which the output data of the FF 52 is inputted, and a sequential circuit 65.

The pattern data has been previously stored in a pattern data storing section 65a in the sequential circuit 65. The sequential circuit 65 compares an output pattern of the parity check circuit 71, with the pattern data stored in the pattern data storing section 65a, and outputs the division number change signal DNC corresponding to the pattern data which has matched, to the division number designating section 43.

In the cache memory according to the present embodiment, the division number change is performed based on the pattern data stored in the pattern data storing section 65a, that is, data error information. It should be noted that "based on the data error information" includes both icases of "based on the data error information" and "based on correct data information".

Hereinafter, for each state of the access mode and the operation timing margin, an operation of the cache memory 16B based on the output pattern of the parity check circuit 71 and the pattern data stored in the pattern data storing section 65a will be described.

2. Operations

First, a case where the cache access controller operates in the 400 MHz mode and the operation timing margin at 400 MHz is large will be described.

FIGS. 17A to 17F are timing charts showing states of the read data of the CPU core 15, the input data and the output data of the FF 52, and an output of the parity check circuit 71, when the cache access controller operates in the 400 MHz mode and the operation timing margin at 400 MHz is large.

In a case of FIGS. 17A to 17F, the amount of delay of the read data is small, and in the period t2, the FF 52 correctly captures the read data of the way #0. The parity check circuit 71 connected to a post-stage of the FF 52 confirms consistency between the read data and a parity bit attached to the read data, and outputs "0" indicating "normal". Consequently, also in the next CPU cycle, the cache access controller 16a maintains the 400 MHz operation.

In other words, the data "0" in the period t2 is previously stored in the pattern data storing section 65a at the time of the 400 MHz mode, and the stored pattern data is compared with the output pattern of the parity check circuit 71. Then, since the operation timing margin at 400 MHz is large, the sequential circuit 65 does not output the division number change signal DNC. As a result, the cache access controller 16a maintains the access mode as the 400 MHz mode, as indicated by the arrow TM44 of FIG. 25.

Consequently, the following pattern data P0 has been stored in the pattern data storing section 65a.

P0: * 0 * * a) When Operation Timing Margin at 400 MHz is Small in 400 MHz Mode (in Case of Arrow TM42 of FIG. 25)

FIGS. 18A to 18F are timing charts showing the states of the read data of the CPU core 15, the input data and the output data of the FF 52, and the output of the parity check circuit 71, when the operation timing margin at 400 MHz is small while the operation is performed in the 400 MHz mode.

In a case of FIGS. 18A to 18F, as indicated by an arrow A11, the amount of delay of the read data is large, and in the period t2, the FF 52 cannot correctly capture the read data of the way #0, and captures data including an indefinite value. Hence, the output data of the FF 52 becomes the indefinite value, and the error is detected in the parity check circuit 71. As a result, the parity check circuit 71 outputs "1" indicating the error. Consequently, in the next CPU cycle, the cache access controller 16a shifts to the 200 MHz operation.

It is judged that the operation timing margin at 400 MHz is small when the operation is performed in the 400 MHz mode, since the output of the parity check circuit 71 is "1" in the period t2 in the above described FIG. 18F.

Consequently, the following pattern data Pa has been stored in the pattern data storing section 65a.

Pa: * 1 * *

In other words, "1" as the data in the period t2 is previously stored in the pattern data storing section 65a at the time of the 400 MHz mode, and the stored pattern data is compared with the output pattern of the parity check circuit 71. Then, since the operation timing margin at 400 MHz is small, the sequential circuit 65 outputs the division number change signal DNC. As a result, the cache access controller 16a shifts the access mode from the 400 MHz mode to the 200 MHz mode, as indicated by the arrow TM42 of FIG. 25.

b) When Operation Timing Margin in 400 MHz Mode is Small and Operation Timing Margin in 200 MHz Mode is Large in 200 MHz Mode (in Case of Arrow TM22 of FIG. 25)

FIGS. 19A to 19F are timing charts showing the states of the read data of the CPU core 15, the input data and the output data of the FF 52, and the output of the parity check circuit 71, when the operation timing margin at 400 MHz is small and the operation timing margin in the 200 MHz mode is large while the operation is performed in the 200 MHz mode.

In a case of FIGS. 19A to 19F, as indicated by an arrow A12, the amount of delay of the read data is large, and in the period t2, the FF 52 cannot correctly capture the read data of the way #0 or #1, and captures data including an indefinite value. Hence, the output data of the FF 52 becomes the indefinite value, and the error is detected in the parity check circuit 71. As a result, the parity check circuit 71 outputs "1" indicating the error. In the next period t3, since the read data of the way #0 or #1 is correctly captured for the output data of the FF 52, the parity check circuit 71 outputs "0".

However, in the next period t4, similarly to the period t2, the FF 52 cannot correctly capture the read data of the way #2 or #3, the output data of the FF 52 becomes an indefinite value, and the parity check circuit 71 outputs "1" indicating the error. In the next period t5, since the read data of the way #2 or #3 is correctly captured for the output data of the FF 52, the parity check circuit 71 outputs "0".

Consequently, in the next CPU cycle, the cache access controller 16a maintains the 200 MHz operation.

It is judged that the operation timing margin at 400 MHz is small and the operation timing margin in the 200 MHz mode is large when the operation is performed in the 200 MHz mode, since the output of the parity check circuit 71 is "1" in the period t2 and is "0" in the period t3 in the above described FIG. 19F.

Consequently, the following pattern data Pb has been stored in the pattern data storing section 65a.

Pb: * 1 0 *

In other words, "1" as the data in the period t2 and "0" as the data in the period t3 are previously stored in the pattern data storing section 65a at the time of the 200 MHz mode, and the stored pattern data is compared with the output pattern of the parity check circuit 71. Then, since the operation timing margin at 200 MHz is large, the sequential circuit 65 does not output the division number change signal DNC. As a result, the cache access controller 16a maintains the access mode as the 200 MHz mode, as indicated by the arrow TM22 of FIG. 25.

It should be noted that FIGS. 20A to 20F are timing charts showing the states of the read data of the CPU core 15, the input data and the output data of the FF 52, and the output of the parity check circuit 71, when the cache access controller 16a operates at 200 MHz, there is no operation timing margin in the 400 MHz mode (that is, there is the timing violation), and the operation timing margin at 200 MHz is large.

In a case of FIGS. 20A to 20F, as indicated by an arrow A13, the amount of delay of the read data is large, and in the period t2, the read data is an indefinite value. Hence, the output of the parity check circuit 71 indicates "1". However, in the period t3, a normal value is captured in the FF 52. As a result, the output of the parity check circuit 71 is "0". Therefore, similarly to the case of FIGS. 19A to 19F, the cache access controller 16a maintains the 200 MHz mode, as indicated by the arrow TM22 of FIG. 25.

c) When Operation Timing Margin in 200 MHz Mode is Small in 200 MHz Mode (in Case of Arrow TM21 of FIG. 25)

FIGS. 21A to 21F are timing charts showing the states of the read data of the CPU core 15, the input data and the output data of the FF 52, and the output of the parity check circuit 71, when the operation timing margin at 200 MHz is small while the operation is performed in the 200 MHz mode.

In a case of FIGS. 21A to 21F, as indicated by an arrow A14, the amount of delay of the read data is large, and in the period t3, the FF 52 cannot correctly capture the read data of the way #0 or #1, and captures data including an indefinite value. Hence, the output data of the FF 52 becomes the indefinite value, and the error is detected in the parity check circuit 71.

However, in the next period t4, since the FF 52 correctly captures the read data of the way #0 or #1, the parity check circuit 71 outputs "0". Furthermore, in the next period t5, the FF 52 cannot correctly capture the read data of the way #2 or #3, and captures data including an indefinite value. Hence, the output data of the FF 52 becomes the indefinite value, and the error is detected in the parity check circuit 71. In a period t6 following the period t5, since the read data of the way #2 or #3 is correctly captured for the output data of the FF 52, the parity check circuit 71 outputs "0".

Consequently, in the next CPU cycle, the cache access controller 16a shifts to the 100 MHz operation.

It is judged that the operation timing margin at 200 MHz is small when the operation is performed in the 200 MHz mode, since the output of the parity check circuit 71 is "1" in the period t3 in the above described FIG. 21F.

Consequently, the following pattern data Pc has been stored in the pattern data storing section 65a.

Pc: * * 1 *

In other words, "1" as the data in the period t3 is previously stored in the pattern data storing section 65a at the time of the 200 MHz mode, and the stored pattern data is compared with the output pattern of the parity check circuit 71. Then, since the operation timing margin at 200 MHz is small, the sequential circuit 65 outputs the division number change signal DNC. As a result, the cache access controller 16a shifts the access mode from the 200 MHz mode to the 100 MHz mode, as indicated by the arrow TM21 of FIG. 25.

d) When Both Operation Timing Margins in 200 MHz Mode and 400 MHz Mode are Large in 200 MHz Mode (in Case of Arrow TM24 of FIG. 25)

FIGS. 22A to 22F are timing charts showing the states of the read data of the CPU core 15, the input data and the output data of the FF 52, and the output of the parity check circuit 71, when the operation timing margin at 400 MHz is large and the operation timing margin in the 200 MHz mode is large while the operation is performed in the 200 MHz mode.

In a case of FIGS. 22A to 22F, as indicated by an arrow A15, the amount of delay of the read data is small, and in the period t2, the FF 52 correctly captures the read data of the way #0 or #1. Therefore, the parity check circuit 71 outputs "0". Subsequently, since the read data of the way #2 or #3 is also correctly captured for the output data of the FF 52, the parity check circuit 71 outputs "0".

Consequently, in the next CPU cycle, the cache access controller 16a shifts to the 400 MHz mode.

It is judged that the operation timing margin at 400 MHz is large and the operation timing margin in the 200 MHz mode is large when the operation is performed in the 200 MHz mode, since the output of the parity check circuit 71 is "0" in the period t2 in the above described FIG. 22F.

Consequently, the following pattern data Pd has been stored in the pattern data storing section 65a.

Pd: * 0 * *

In other words, the data "0" in the period t2 is stored in the pattern data storing section 65a at the time of the 200 MHz mode. When the cache access controller 16a operates in the 200 MHz mode, and the output of the parity check circuit 71 is "0" in the period t2, the operation timing margin at 400 MHz is large. Therefore, the division number change signal DNC is outputted. As a result, the cache access controller 16a shifts the access mode from the 200 MHz mode to the 400 MHz mode, as indicated by the arrow TM24 of FIG. 25.

e) When Operation Timing Margin in 200 MHz Mode is Small in 100 MHz Mode (in Case of Arrow TM11 of FIG. 25)

FIGS. 23A to 23F are timing charts showing the states of the read data of the CPU core 15, the input data and the output data of the FF 52, and the output of the parity check circuit 71, when the operation timing margin at 200 MHz is small while the operation is performed in the 100 MHz mode.

In a case of FIGS. 23A to 23F, as indicated by an arrow A16, the amount of delay of the read data is large, and in the period t3, the FF 52 cannot correctly capture the read data of any of the ways #0 to #3, and captures data including an indefinite value. Hence, the output data of the FF 52 becomes the indefinite value, and the error is detected in the parity check circuit 71.

However, in the next period t4 and subsequent periods, since the FF 52 correctly captures the read data of any of the ways #0 to #3, the parity check circuit 71 outputs "0".

Consequently, in the next CPU cycle, the cache access controller 16a maintains the 100 MHz operation.

It should be noted that, in the period t2, since the input data of the FF 52 is an indefinite value, the output of the parity check circuit 71 is "1".

It is judged that the operation timing margin at 200 MHz is small when the operation is performed in the 100 MHz mode, since the output of the parity check circuit 71 is "1" in the period t3 in the above described FIG. 23F.

Consequently, the following pattern data Pe has been stored in the pattern data storing section 65a.

Pe: * * 1 *

In other words, "1" as the data in the period t3 is stored in the pattern data storing section 65a at the time of the 100 MHz mode, and the stored pattern data is compared with the output pattern of the parity check circuit 71. Then, since the operation timing margin at 200 MHz is small, the sequential circuit 65 does not output the division number change signal DNC. As a result, the cache access controller 16a maintains the access mode as the 100 MHz mode, as indicated by the arrow TM11 of FIG. 25.

f) When Operation Timing Margin in 200 MHz Mode is Large in 100 MHz Mode (in Case of Arrow TM12 of FIG. 25)

FIGS. 24A to 24F are timing charts showing the states of the read data of the CPU core 15, the input data and the output data of the FF 52, and the output of the parity check circuit 71, when the operation timing margin in the 200 MHz mode is large while the operation is performed in the 100 MHz mode.

In a case of FIGS. 24A to 24F, as indicated by an arrow A17, the amount of delay of the read data is small, and in the period t3, the FF 52 correctly captures the read data of any of the ways #0 to #3. Therefore, the parity check circuit 71 outputs "0". Subsequently, since the read data of any of the ways #0 to #3 is also correctly captured for the output data of the FF 52, the parity check circuit 71 outputs "0".

Consequently, in the next CPU cycle, the cache access controller 16a shifts to the 200 MHz operation.

It is judged that the operation timing margin at 200 MHz is large when the operation is performed in the 100 MHz mode, since the output of the parity check circuit 71 is "0" in the period t3 in the above described FIG. 24F.

Consequently, the following pattern data Pf has been stored in the pattern data storing section 65a.

Pf: * * 0 *

In other words, "0" as the data in the period t3 is stored in the pattern data storing section 65a at the time of the 100 MHz mode, and the stored pattern data is compared with the output pattern of the parity check circuit 71. Then, since the operation timing margin at 200 MHz is large, the sequential circuit 65 outputs the division number change signal DNC. As a result, the cache access controller 16a shifts the access mode from the 100 MHz mode to the 200 MHz mode, as indicated by the arrow TM12 of FIG. 25.

As described above, according to a cache memory control device of the present embodiment, the data error information can be obtained by the parity check circuit configured to check a parity error in the read data, as an error detecting section configured to detect an error in data. The division number change signal DNC is outputted based on the obtained data error information.

Therefore, when the cache hit occurs for the selection of the plurality of ways, the cache memory device of the present embodiment stops the subsequent selection, and changes the access mode based on an output state of a data error check circuit and the access mode of the cache memory 16B. Therefore, the cache memory device of the present embodiment can operate with the lowest possible power consumption while having the cache hit performance equivalent to the normal access mode.

It should be noted that the error detecting section may be a cyclic redundancy check circuit configured to check consecutive errors in the read data.

As described above, the cache memory of the above described respective embodiments uses a circuit attached to a memory read path to detect the timing violation. Therefore, the timing violation occurring in the memory read path can be detected more precisely than in the conventional case. Consequently, an operation time in lower power consumption modes can be lengthened compared with that in the conventional case, and average power consumption for the cache memory can be reduced.

It should be noted that, the respective embodiments in a case of the 4-way set associative cache memory have been described in which the clock frequency of the CPU is 100 MHz, the clock frequency of the cache memory is 400 MHz, and the access modes of the cache are the 400 MHz, 200 MHz and 100 MHz modes. However, other numbers of ways or other operating frequencies may be possible.

As described above, according to the above described respective embodiments, it is possible to realize the cache memory control circuit and the processor which can operate the cache memory with the lowest possible power consumption, while having the cache hit performance equivalent to the normal access mode.

The present invention is not limited to the above described embodiments, and various modifications, alterations and the like can be made in a range not changing the gist of the present invention.

What is claimed is:

1. A cache memory control circuit, comprising:
   a selecting section configured to be able to select each way or two or more ways in a cache memory in which a plurality of ways have been divided by a predetermined division number, in a predetermined order;
   a cache hit detecting section configured to detect a cache hit in the each way or two or more ways;
   a controlling section configured to, if the cache hit is detected, stop the selection of the each way or two or more ways in the selecting section; and
   a division number changing section having a comparing section, which compares respective values of two pieces of read data from the cache memory having been propagated through two read data paths, one of which has a predetermined amount of delay with respect to the other one, the division number changing section being configured to change the predetermined division number depending on whether the two pieces of the read data match or mismatch with each other in the comparing section.

2. The cache memory control circuit according to claim 1, wherein:
   the comparing section includes a plurality of comparators, each of which compares the two pieces of the read data at a timing of a frequency depending on the predetermined division number, and
   the division number changing section changes the predetermined division number for the division, depending on whether the two pieces of the read data match or mismatch with each other in the plurality of comparators.

3. The cache memory control circuit according to claim 2, wherein:
   the division number changing section changes the predetermined division number so that the predetermined division number is increased if the two pieces of the read data match with each other, and so that the predetermined division number is decreased if the two pieces of the read data mismatch with each other.

4. The cache memory control circuit according to claim 3, wherein:
   the division number changing section includes a determining section configured to determine to increase or decrease the predetermined division number, and
   the determining section determines to increase or decrease the predetermined division number, based on information on the match or the mismatch, and timing information on the match or the mismatch, which are comparison results from the plurality of comparators.

5. The cache memory control circuit according to claim 1, wherein:
   the division number changing section changes the predetermined division number, based on pattern information on a timing of the match or the mismatch, and information on the timing of the match or the mismatch between the two pieces of the read data in the comparing section.

6. The cache memory control circuit according to claim 5, wherein:
the pattern information has been previously stored in a pattern information storing section.

7. The cache memory control circuit according to claim 1, wherein:
the predetermined division number is a division number which has been set depending on an operating frequency of a CPU connected to the cache memory, and the selecting section divides one CPU cycle and selects the each way or the predetermined two or more ways within each divided period of the one CPU cycle.

8. The cache memory control circuit according to claim 7, further comprising:
a division table in which a plurality of the division numbers have been set for the operating frequency of the CPU,
wherein the selecting section divides the one CPU cycle by the division number which has been set in the division table.

9. A processor, comprising:
a cache memory control circuit comprising a selecting section configured to be able to select each way or two or more ways in a cache memory in which a plurality of ways have been divided by a predetermined division number, in a predetermined order; a cache hit detecting section configured to detect a cache hit in the each way or two or more ways; a controlling section configured to, if the cache hit is detected, stop the selection of the each way or two or more ways in the selecting section; and a division number changing section having a comparing section, which compares respective values of two pieces of read data from the cache memory having been propagated through two read data paths, one of which has a predetermined amount of delay with respect to the other one, the division number changing section being configured to change the predetermined division number depending on whether the two pieces of the read data match or mismatch with each other in the comparing section; and
a CPU connected to the cache memory.

10. The processor according to claim 9, wherein:
the comparing section includes a plurality of comparators, each of which compares the two pieces of the read data at a timing of a frequency depending on the predetermined division number, and
the division number changing section changes the predetermined division number for the division, depending on whether the two pieces of the read data match or mismatch with each other in the plurality of comparators.

11. The processor according to claim 10, wherein:
the division number changing section changes the predetermined division number so that the predetermined division number is increased if the two pieces of the read data match with each other, and so that the predetermined division number is decreased if the two pieces of the read data mismatch with each other.

12. The processor according to claim 11, wherein:
the division number changing section includes a determining section configured to determine to increase or decrease the predetermined division number, and
the determining section determines to increase or decrease the predetermined division number, based on information on the match or the mismatch, and timing information on the match or the mismatch, which are comparison results from the plurality of comparators.

13. The processor according to claim 9, wherein:
the division number changing section changes the predetermined division number, based on pattern information on a timing of the match or the mismatch, and information on the timing of the match or the mismatch between the two pieces of the read data in the comparing section.

14. The processor according to claim 13, wherein:
the pattern information has been previously stored in a pattern information storing section.

* * * * *